United States Patent
Xiao

(10) Patent No.: US 9,654,516 B2
(45) Date of Patent: May 16, 2017

(54) METHOD AND DEVICE FOR NEGOTIATING MEDIA CAPABILITY

(71) Applicant: Huawei Technologies Co., Ltd., Shenzhen (CN)

(72) Inventor: Jing Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/248,595

(22) Filed: Aug. 26, 2016

(65) Prior Publication Data

US 2016/0366190 A1 Dec. 15, 2016

Related U.S. Application Data

(63) Continuation of application No. PCT/CN2014/090784, filed on Nov. 11, 2014.

(30) Foreign Application Priority Data

Feb. 28, 2014 (CN) .......................... 2014 1 0073978

(51) Int. Cl.
*H04N 7/15* (2006.01)
*H04L 29/06* (2006.01)
*H04N 7/14* (2006.01)

(52) U.S. Cl.
CPC ...... *H04L 65/1059* (2013.01); *H04L 65/1009* (2013.01); *H04L 65/1069* (2013.01); *H04L 65/403* (2013.01); *H04L 69/24* (2013.01); *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 8,502,855 B2 * | 8/2013 | Lindstrom | H04L 65/1016 348/14.01 |
| 2004/0076145 A1 * | 4/2004 | Kauhanen | H04L 29/06027 370/352 |
| 2009/0003570 A1 * | 1/2009 | Sindhwani | H04M 7/0072 379/157 |
| 2014/0317183 A1 * | 10/2014 | Shah | H04L 65/403 709/204 |
| 2015/0172558 A1 * | 6/2015 | Ye | H04N 7/15 348/598 |

* cited by examiner

*Primary Examiner* — Joseph J Nguyen
(74) *Attorney, Agent, or Firm* — Conley Rose, P.C.

(57) ABSTRACT

A method includes sending, by a first device, a first message to a second device, sending a third message to the second device, where the first message includes information about at least one media capture capability supported by the first device, and at least one first association identifier, the third message includes at least one configuration item supported by the first device and at least one second association identifier, and the at least one first association identifier corresponds to the at least one second association identifier in a one-to-one manner, and receiving, a second message and a fourth message sent by the second device, where the second message includes at least one media capture capability that is selected by the second device according to the first message and the third message, and at least one third association identifier corresponding to the at least one media capture capability.

18 Claims, 6 Drawing Sheets

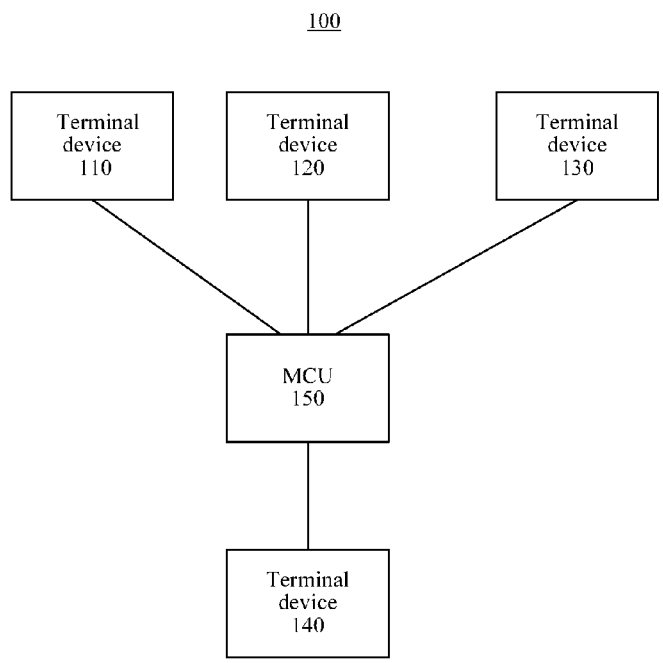

METHOD AND DEVICE FOR NEGOTIATING MEDIA CAPABILITY

CROSS-REFERENCE TO RELATED APPLICATIONS

This application is a continuation of International Application No. PCT/CN2014/090784, filed on Nov. 11, 2014, which claims priority to Chinese Patent Application No. 201410073978.0, filed on Feb. 28, 2014, both of which are hereby incorporated by reference in their entireties.

TECHNICAL FIELD

The present disclosure relates to a video conferencing system, and further, to a method and device for negotiating a media capability.

BACKGROUND

With development of media communications technologies, a video conference terminal has a more vigorous demand on multiple streams. The application of only one video stream and only one audio stream can no longer satisfy the pursuit of people for multi-screen and continuous presence. In the Internet Engineering Task Force (IETF), controlling multiple streams for telepresence (CLUE). Generally, CLUE may be used in the session initiation protocol (SIP) suite, and negotiation on multiple audio and video streams may be implemented using the SIP suite.

However, under practical conditions, interworking of multiple media streams is needed between terminals that use the multimedia transfer protocol (for example, the H.323 protocol). In the prior art, a solution to negotiation between multi-stream media capabilities is implemented using the SIP and the CLUE protocol, but this solution is not applicable to a terminal using a common multimedia transfer protocol other than the SIP.

Therefore, how to implement capability negotiation of multiple media streams using CLUE in a case in which a common multimedia transfer protocol is used is an urgent problem to be resolved.

SUMMARY

Embodiments of the present disclosure provide a communications method and device, which can implement capability negotiation of multiple media streams using CLUE when a common multimedia transfer protocol is used.

According to a first aspect, a method for negotiating a media capability is provided, including sending, by a first device, a first message to a second device, and sending a third message to the second device, where the first message includes information about at least one media capture capability supported by the first device, and at least one first association identifier corresponding to the at least one media capture capability, the third message includes at least one configuration item supported by the first device and at least one second association identifier corresponding to the at least one configuration item, and the at least one first association identifier corresponds to the at least one second association identifier in a one-to-one manner, and receiving, by the first device, a second message sent by the second device, and receiving a fourth message sent by the second device, where the second message includes at least one media capture capability that is selected by the second device according to the first message and the third message, and at least one third association identifier corresponding to the at least one media capture capability, and the fourth message is a response message for the third message.

With reference to the first aspect, in a first possible implementation manner, the at least one first association identifier is respectively the same as the at least one second association identifier, and/or the third association identifier is a subset of the first association identifier or the second association identifier.

With reference to the first aspect, in a second possible implementation manner, the method further includes sending, by the first device, a first call setup message to the second device, where the first call setup message includes a parameter used to indicate that a CLUE message is supported, and receiving, by the first device, a second call setup message sent by the second device, where the second call setup message includes a parameter used to indicate that a CLUE message is supported.

With reference to the second possible implementation manner of the first aspect, in a third possible implementation manner, the first call setup message and the second call setup message are H.225 protocol messages in the H.323 protocol suite.

With reference to the first aspect or any one of the first to third implementation manners of the first aspect, in a fourth possible implementation manner, after receiving, by the first device, a second message sent by the second device, and receiving a fourth message sent by the second device, the method further includes sending, by the first device, a fifth message to the second device according to the second message, where the fifth message includes at least one fourth association identifier corresponding to the at least one configuration item, the fifth message is used to request to enable at least one logical channel corresponding to the at least one fourth association identifier, and the at least one fourth association identifier respectively corresponds to the at least one third association identifier, receiving, by the first device, a sixth message sent by the second device, where the sixth message is a response message for the fifth message, and sending, by the first device, a corresponding media stream on the at least one logical channel according to the sixth message.

With reference to the fourth implementation manner of the first aspect, in a fifth implementation manner, the method further includes sending, by the first device, a first termination message to the second device, where the first termination message includes a fourth association identifier corresponding to at least one to-be-terminated logical channel, and the first termination message is used to request to terminate the at least one to-be-terminated logical channel, and receiving, by the first device, a second termination message sent by the second device, where the second termination message is a response message for the first termination message.

With reference to the first aspect or any one of the first to fifth implementation manners of the first aspect, in a sixth implementation manner, before sending, by a first device, a first message to a second device, and sending a third message to the second device, the method further includes sending, by the first device, a first version message to the second device, where the first version message is used to indicate a CLUE version supported by the first device, and receiving, by the first device, a second version message sent by the second device, where the second version message is used to indicate a CLUE version supported by the second device.

With reference to the first aspect or any one of the first to sixth implementation manners of the first aspect, in a seventh implementation manner, after receiving, by the first device, a second message sent by the second device, and receiving a fourth message sent by the second device, the method further includes receiving, by the first device, a second update message sent by the second device, where the second update message includes at least one to-be-updated media capture capability determined by the second device and at least one third association identifier corresponding to the at least one to-be-updated media capture capability, and sending, by the first device, an updated media stream according to the second update message.

With reference to the seventh implementation manner of the first aspect, in an eighth implementation manner, before receiving, by the first device, a second update message sent by the second device, the method further includes sending, by the first device, a first update message to the second device, where the first update message includes information about at least one to-be-updated media capture capability, and at least one first association identifier corresponding to the at least one to-be-updated media capture capability.

With reference to the first aspect or the first to sixth implementation manners of the first aspect, in a ninth implementation manner, the method further includes sending, by the first device, a first update message and a third update message to the second device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item, receiving, by the first device, a second update message and a fourth update message that are sent by the second device, where the second update message includes at least one to-be-updated media capture capability determined by the second device, and at least one third association identifier corresponding to the at least one to-be-updated media capture capability, and the fourth update message is a response message for the third update message, sending, by the first device, a fifth update message to the second device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item, receiving, by the first device, a sixth update message sent by the second device, where the sixth update message is a response message for the fifth update message, and sending, by the first device, a corresponding media stream on at least one updated logical channel according to the sixth update message.

With reference to the first aspect or any one of the first to ninth implementation manners of the first aspect, in a tenth implementation manner, the method further includes receiving, by the first device, the sixth message sent by the second device, and receiving an eighth message sent by the second device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier, selecting, by the first device, at least one media capture capability according to the sixth message and the eighth message, sending, by the first device, a seventh message to the second device, and sending a ninth message to the second device, where the seventh message includes the at least one media capture capability selected by the first device, and at least one seventh association identifier corresponding to the at least one media capture capability selected by the first device, and the ninth message is a response message for the eighth message, receiving, by the first device, a tenth message sent by the second device, where the tenth message includes at least one eighth association identifier corresponding to at least one configuration item selected by the first device, the tenth message is used to request to enable at least one logical channel corresponding to the eighth association identifier, and the at least one eighth association identifier respectively corresponds to the at least one seventh association identifier, sending, by the first device, an eleventh message to the second device, where the eleventh message is a response message for the tenth message, and receiving, by the first device, on the at least one logical channel, a media stream sent by the second device.

With reference to the first aspect or any one of the first to tenth implementation manners of the first aspect, in an eleventh implementation manner, the first device is a multipoint control unit (MCU).

With reference to the first aspect or any one of the first to eleventh implementation manners of the first aspect, in a twelfth implementation manner, the first device and the second device support CLUE, and the first message, the second message, the third message, and the fourth message are H.245 protocol messages in the H.323 protocol suite.

With reference to the twelfth implementation manner of the first aspect, in a thirteenth implementation manner, the first message is a request message, the second message is a terminal capability set message, the third message is a request message, and the fourth message is a terminal capability set acknowledgment message.

According to a second aspect, a method for negotiating a media capability is provided, including receiving, by a second device, a first message sent by a first device, and receiving a third message sent by the first device, where the first message includes information about at least one media capture capability supported by the first device, and at least one first association identifier corresponding to the at least one media capture capability, the third message includes at least one configuration item supported by the first device and at least one second association identifier corresponding to the at least one configuration item, and the at least one first association identifier corresponds to the at least one second association identifier, selecting, by the second device, at least one media capture capability according to the first message and the third message, and sending, by the second device, a second message to the first device, and sending a fourth message to the first device, where the second message includes the at least one media capture capability selected by the second device and at least one third association identifier corresponding to the at least one media capture capability, and the fourth message is a response message for the third message.

With reference to the first implementation manner of the second aspect, in a second implementation manner of the second aspect, the at least one first association identifier is respectively the same as the at least one second association identifier, and/or the third association identifier is a subset of the first association identifier or the second association identifier.

With reference to the second aspect or the first implementation manner of the second aspect, in a second implementation manner of the second aspect, before receiving, by a second device, a first message sent by a first device, and receiving a third message sent by the first device, the method further includes receiving, by the second device, a first call setup message sent by the first device, where the first call setup message includes a parameter used to indicate that a CLUE message is supported, and sending, by the second device, a second call setup message to the first device, where the second call setup message includes a parameter used to indicate that a CLUE message is supported.

With reference to the second implementation manner of the second aspect, in a third implementation manner of the second aspect, the first call setup message and the second call setup message are H.225 protocol messages in the H.323 protocol suite.

With reference to the second aspect or any one of the first to third implementation manners of the second aspect, in a fourth implementation manner of the second aspect, after sending, by the second device, a second message to the first device, and sending a fourth message to the first device, the method further includes receiving, by the second device, a fifth message that is sent by the first device according to the second message, where the fifth message includes at least one fourth association identifier corresponding to the at least one configuration item, the fifth message is used to request to enable at least one logical channel corresponding to the at least one fourth association identifier, and the at least one fourth association identifier respectively corresponds to the at least one third association identifier, sending, by the second device, a sixth message to the first device, where the sixth message is a response message for the fifth message, and receiving, by the second device, on the at least one logical channel, a corresponding media stream that is sent by the first device according to the sixth message.

With reference to the fourth implementation manner of the second aspect, in a fifth implementation manner of the second aspect, the method further includes receiving, by the second device, a first termination message sent by the first device, where the first termination message includes a fourth association identifier corresponding to at least one to-be-terminated logical channel, and the first termination message is used to request to terminate the at least one to-be-terminated logical channel, and sending, by the second device, a second termination message to the first device, where the second termination message is a response message for the first termination message.

With reference to the second aspect or any one of the first to fifth implementation manners of the second aspect, in a sixth implementation manner of the second aspect, before receiving, by a second device, a first message sent by a first device, and receiving a third message sent by the first device, the method further includes receiving, by the second device, a first version message sent by the first device, where the first version message is used to indicate a CLUE version supported by the first device, and sending, by the second device, a second version message to the first device, where the second version message is used to indicate a CLUE version supported by the second device.

With reference to the second aspect or any one of the first to sixth implementation manners of the second aspect, in a seventh implementation manner of the second aspect, after sending, by the second device, a second message to the first device, and sending a fourth message to the first device, the method further includes sending, by the second device, a second update message to the first device, where the second update message includes at least one to-be-updated media capture capability determined by the second device and at least one third association identifier corresponding to the at least one to-be-updated media capture capability, and receiving, by the second device, an updated media stream that is sent by the first device according to the second update message.

With reference to the seventh implementation manner of the second aspect, in an eighth implementation manner of the second aspect, before sending, by the second device, a second update message to the first device, the method further includes receiving, by the second device, a first update message sent by the first device, where the first update message includes information about at least one to-be-updated media capture capability, and at least one first association identifier corresponding to the at least one to-be-updated media capture capability.

With reference to the second aspect or any one of the first to sixth implementation manners of the second aspect, in a ninth implementation manner of the second aspect, the method further includes receiving, by the second device, a first update message and a third update message that are sent by the first device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item, sending, by the second device, a second update message and a fourth update message to the first device, where the second update message includes at least one to-be-updated media capture capability determined by the second device and at least one first association identifier corresponding to the at least one to-be-updated media capture capability, and the fourth update message is a response message for the third update message, receiving, by the second device, a fifth update message that is sent by the first device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item, sending, by the second device, a sixth update message to the first device, where the sixth update message is a response message for the fifth update message, and receiving, by the second device, on at least one updated logical channel, a corresponding media stream that is sent by the first device according to the sixth update message.

With reference to the second aspect or any one of the first to ninth implementation manners of the second aspect, in a tenth implementation manner of the second aspect, after sending, by the second device, a second message to the first device, and sending a fourth message to the first device, the method further includes sending, by the second device, the sixth message to the first device, and sending an eighth message to the first device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier, receiving, by the second device, a seventh message sent by the first device, and receiving a ninth message sent by the first device, where the seventh message includes at least one media capture capability selected by the first device and at least one seventh association identifier corresponding to the at least one media capture capability selected by the first device, and the ninth message is a response message for the eighth message, sending, by the second device, a tenth message to the first device, where the tenth message includes at least one configuration item selected by the first device and at least one eighth association identifier corresponding to the at least one configuration item selected by the first device, the tenth message is used to request to enable at least one logical channel corresponding to the eighth association identifier, and the at least one eighth association identifier respectively corresponds to the at least one seventh association identifier, receiving, by the second device, an eleventh message sent by the first device, where the eleventh message is a response message for the tenth message, and sending, by the second device, a media stream on the at least one logical channel to the first device.

With reference to the second aspect or any one of the first to tenth implementation manners of the second aspect, in an eleventh implementation manner of the second aspect, the first device is an MCU.

With reference to the second aspect or any one of the first to eleventh implementation manners of the second aspect, in a twelfth implementation manner of the second aspect, the first device and the second device support CLUE, and the first message, the second message, the third message, and the fourth message are H.245 protocol messages in the H.323 protocol suite.

With reference to the twelfth implementation manner of the second aspect, in a thirteenth implementation manner of the second aspect, the first message is a request message, the second message is a terminal capability set message, the third message is a request message, and the fourth message is a terminal capability set acknowledgment message.

According to a third aspect, a device for negotiating a media capability is provided, including a sending module configured to send a first message to a second device, and send a third message to the second device, where the first message includes information about at least one media capture capability supported by the device, and at least one first association identifier corresponding to the at least one media capture capability, the third message includes at least one configuration item supported by the device and at least one second association identifier corresponding to the at least one configuration item, and the at least one first association identifier corresponds to the at least one second association identifier in a one-to-one manner, and a receiving module configured to receive a second message sent by the second device, and receive a fourth message sent by the second device, where the second message includes at least one media capture capability that is selected by the second device according to the first message and the third message, and at least one third association identifier corresponding to the at least one media capture capability, and the fourth message is a response message for the third message.

With reference to the third aspect, in a first possible implementation manner of the third aspect, the at least one first association identifier is respectively the same as the at least one second association identifier, and/or the third association identifier is a subset of the first association identifier or the second association identifier.

With reference to the third aspect, in a second possible implementation manner of the third aspect, before the sending module sends the first message to the second device and sends the third message to the second device, the sending module sends a first call setup message to the second device, where the first call setup message includes a parameter used to indicate that a CLUE message is supported, and the receiving module receives a second call setup message sent by the second device, where the second call setup message includes a parameter used to indicate that a CLUE message is supported.

With reference to the second possible implementation manner of the third aspect, in a third possible implementation manner of the third aspect, the first call setup message and the second call setup message are H.225 protocol messages in the H.323 protocol suite.

With reference to the third aspect or any one of the first to third implementation manners of the third aspect, in a fourth possible implementation manner of the third aspect, after the receiving module receives the second message sent by the second device and receives the fourth message sent by the second device, the sending module sends a fifth message to the second device according to the second message, where the fifth message includes at least one fourth association identifier corresponding to the at least one configuration item, the fifth message is used to request to enable at least one logical channel corresponding to the at least one fourth association identifier, and the at least one fourth association identifier respectively corresponds to the at least one third association identifier. The receiving module receives a sixth message sent by the second device, where the sixth message is a response message for the fifth message, and the sending module sends a corresponding media stream on the at least one logical channel according to the sixth message.

With reference to the fourth implementation manner of the third aspect, in a fifth implementation manner of the third aspect, the sending module is further configured to send a first termination message to the second device, where the first termination message includes a fourth association identifier corresponding to at least one to-be-terminated logical channel, and the first termination message is used to request to terminate the at least one to-be-terminated logical channel, and the receiving module is further configured to receive a second termination message sent by the second device, where the second termination message is a response message for the first termination message.

With reference to the third aspect or any one of the first to fifth implementation manners of the third aspect, in a sixth implementation manner of the third aspect, before the sending module sends the first message to the second device and sends the third message to the second device, the sending module sends a first version message to the second device, where the first version message is used to indicate a CLUE version supported by the device, and the receiving module receives a second version message sent by the second device, where the second version message is used to indicate a CLUE version supported by the second device.

With reference to the third aspect or any one of the first to sixth implementation manners of the third aspect, in a seventh implementation manner of the third aspect, after the receiving module receives the second message sent by the second device and receives the fourth message sent by the second device, the receiving module receives a second update message sent by the second device, where the second update message includes at least one to-be-updated media capture capability determined by the second device and at least one third association identifier corresponding to the at least one to-be-updated media capture capability, and the sending module sends an updated media stream according to the second update message.

With reference to the seventh implementation manner of the third aspect, in an eighth implementation manner of the third aspect, the sending module is further configured to send a first update message to the second device before the receiving module receives the second update message sent by the second device, where the first update message includes information about at least one to-be-updated media capture capability, and at least one first association identifier corresponding to the at least one to-be-updated media capture capability.

With reference to the third aspect or any one of the first to sixth implementation manners of the third aspect, in a ninth implementation manner of the third aspect, the sending module is further configured to send a first update message and a third update message to the second device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The receiving module is further configured to receive a second update message and a fourth update message that are sent by the second device, where the second update message includes at least one to-be-updated media capture capability determined by the second device, and at least one third association identifier corresponding to the at least one to-be-updated media capture capability, and the fourth update message is a response message for the third update message. The sending module is further configured to send a fifth update message to the second device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The receiving module is further configured to receive a sixth update message sent by the second device, where the sixth update message is a response message for the fifth update message, and the sending module is further configured to send a corresponding media stream on at least one updated logical channel according to the sixth update message.

With reference to the third aspect or any one of the first to ninth implementation manners of the third aspect, in a tenth implementation manner of the third aspect, the device further includes a selection module, where the receiving module is further configured to receive the sixth message sent by the second device, and receive an eighth message sent by the second device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier. The selection module is configured to select at least one media capture capability according to the sixth message and the eighth message. The sending module is further configured to send a seventh message to the second device, and send a ninth message to the second device, where the seventh message includes the at least one media capture capability selected by the device, and at least one seventh association identifier corresponding to the at least one media capture capability selected by the device, and the ninth message is a response message for the eighth message. The receiving module is further configured to receive a tenth message sent by the second device, where the tenth message includes at least one eighth association identifier corresponding to at least one configuration item selected by the device, the tenth message is used to request to enable at least one logical channel corresponding to the eighth association identifier, and the at least one eighth association identifier respectively corresponds to the at least one seventh association identifier. The sending module is further configured to send an eleventh message to the second device, where the eleventh message is a response message for the tenth message, and the receiving module is further configured to receive, on the at least one logical channel, a media stream sent by the second device.

With reference to the third aspect or any one of the first to tenth implementation manners of the third aspect, in an eleventh implementation manner of the third aspect, the device is an MCU.

With reference to the third aspect or any one of the first to eleventh implementation manners of the third aspect, in a twelfth implementation manner of the third aspect, the device and the second device support CLUE, and the first message, the second message, the third message, and the fourth message are H.245 protocol messages in the H.323 protocol suite.

With reference to the twelfth implementation manner of the third aspect, in a thirteenth implementation manner of the third aspect, the first message is a request message, the second message is a terminal capability set message, the third message is a request message, and the fourth message is a terminal capability set acknowledgment message.

According to a fourth aspect, a device for negotiating a media capability is provided, including a receiving module configured to receive a first message sent by a first device, and receive a third message sent by the first device, where the first message includes information about at least one media capture capability supported by the first device, and at least one first association identifier corresponding to the at least one media capture capability, the third message includes at least one configuration item supported by the first device and at least one second association identifier corresponding to the at least one configuration item, and the at least one first association identifier corresponds to the at least one second association identifier, and a sending module configured to send a second message to the first device and send a fourth message to the first device, where the second message includes at least one media capture capability selected by the device and at least one third association identifier corresponding to the at least one media capture capability, and the fourth message is a response message for the third message. With reference to the first implementation manner of the fourth aspect, in a second implementation manner of the fourth aspect, the at least one first association identifier is respectively the same as the at least one second association identifier, and/or the third association identifier is a subset of the first association identifier or the second association identifier.

With reference to the fourth aspect or the first implementation manner of the fourth aspect, in a second implementation manner of the fourth aspect, the receiving module is further configured to receive a first call setup message sent by the first device before the receiving module receives the first message sent by the first device and receives the third message sent by the first device, where the first call setup message includes a parameter used to indicate that a CLUE message is supported, and the sending module is further configured to send a second call setup message to the first device, where the second call setup message includes a parameter used to indicate that a CLUE message is supported.

With reference to the second implementation manner of the fourth aspect, in a third implementation manner of the fourth aspect, the first call setup message and the second call setup message are H.225 protocol messages in the H.323 protocol suite.

With reference to the fourth aspect or any one of the first to third implementation manners of the fourth aspect, in a fourth possible implementation manner of the second aspect, the receiving module is further configured to receive a fifth message that is sent by the first device according to the second message after the sending module sends the second message to the first device and sends the fourth message to the first device, where the fifth message includes at least one fourth association identifier corresponding to the at least one configuration item, the fifth message is used to request to enable at least one logical channel corresponding to the at least one fourth association identifier, and the at least one fourth association identifier respectively corresponds to the at least one third association identifier. The sending module is further configured to send a sixth message to the first device, where the sixth message is a response message for the fifth message, and the receiving module is further configured to receive, on the at least one logical channel, a corresponding media stream that is sent by the first device according to the sixth message.

With reference to the fourth implementation manner of the fourth aspect, in a fifth implementation manner of the fourth aspect, the receiving module is further configured to receive a first termination message sent by the first device, where the first termination message includes a fourth association identifier corresponding to at least one to-be-terminated logical channel, and the first termination message is used to request to terminate the at least one to-be-terminated logical channel, and the sending module is further configured to send a second termination message to the first device, where the second termination message is a response message for the first termination message.

With reference to the fourth aspect or any one of the first to fifth implementation manners of the fourth aspect, in a sixth implementation manner of the fourth aspect, the receiving module is further configured to receive a first version message sent by the first device before the receiving module receives the first message sent by the first device and receives the third message sent by the first device, where the first version message is used to indicate a CLUE version supported by the first device, and the sending module is further configured to send a second version message to the first device, where the second version message is used to indicate a CLUE version supported by the device.

With reference to the fourth aspect or any one of the first to sixth implementation manners of the fourth aspect, in a seventh implementation manner of the fourth aspect, the sending module is further configured to send a second update message to the first device after the sending module sends the second message to the first device and sends the fourth message to the first device, where the second update message includes at least one to-be-updated media capture capability determined by the device and at least one third association identifier corresponding to the at least one to-be-updated media capture capability, and the receiving module is further configured to receive an updated media stream that is sent by the first device according to the second update message.

With reference to the seventh implementation manner of the fourth aspect, in an eighth implementation manner of the fourth aspect, the receiving module is further configured to receive a first update message sent by the first device before the sending module sends the second update message to the first device, where the first update message includes information about at least one to-be-updated media capture capability, and at least one first association identifier corresponding to the at least one to-be-updated media capture capability.

With reference to the fourth aspect or any one of the first to sixth implementation manners of the fourth aspect, in a ninth implementation manner of the fourth aspect, the receiving module is further configured to receive a first update message and a third update message that are sent by the device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The sending module is further configured to send a second update message and a fourth update message to the first device, where the second update message includes at least one to-be-updated media capture capability determined by the device and at least one first association identifier corresponding to the at least one to-be-updated media capture capability, and the fourth update message is a response message for the third update message. The receiving module is further configured to receive a fifth update message that is sent by the first device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The sending module is further configured to send a sixth update message to the first device, where the sixth update message is a response message for the fifth update message, and the receiving module is further configured to receive, on at least one updated logical channel, a corresponding media stream that is sent by the first device according to the sixth update message.

With reference to the fourth aspect or any one of the first to ninth implementation manners of the fourth aspect, in a tenth implementation manner of the fourth aspect, the sending module is further configured to send the sixth message to the first device, and send an eighth message to the first device after the sending module sends the second message to the first device and sends the fourth message to the first device, where the sixth message includes information about at least one media capture capability supported by the device, and at least one fifth association identifier corresponding to the at least one media capture capability supported by the device, the eighth message includes at least one configuration item supported by the device and at least one sixth association identifier corresponding to the at least one configuration item supported by the device, and the at least one fifth association identifier corresponds to the at least one sixth association identifier. The receiving module is further configured to receive a seventh message sent by the first device, and receive a ninth message sent by the first device, where the seventh message includes at least one media capture capability selected by the first device and at least one seventh association identifier corresponding to the at least one media capture capability selected by the first device, and the ninth message is a response message for the eighth message. The sending module is further configured to send a tenth message to the first device, where the tenth message includes at least one configuration item selected by the first device and at least one eighth association identifier corresponding to the at least one configuration item selected by the first device, the tenth message is used to request to enable at least one logical channel corresponding to the eighth association identifier, and the at least one eighth association identifier respectively corresponds to the at least one seventh association identifier. The receiving module is further configured to receive an eleventh message sent by the first device, where the eleventh message is a response message for the tenth message, and the sending module is further configured to send a media stream on the at least one logical channel to the first device.

With reference to the fourth aspect or any one of the first to tenth implementation manners of the fourth aspect, in an eleventh implementation manner of the fourth aspect, the first device is an MCU.

With reference to the fourth aspect or any one of the first to eleventh implementation manners of the fourth aspect, in a twelfth implementation manner of the fourth aspect, the first device and the device support CLUE, and the first message, the second message, the third message, and the fourth message are H.245 protocol messages in the H.323 protocol suite.

With reference to the twelfth implementation manner of the fourth aspect, in a thirteenth implementation manner of the fourth aspect, the first message is a request message, the second message is a terminal capability set message, the third message is a request message, and the fourth message is a terminal capability set acknowledgment message.

In the technical solutions of the embodiments of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

BRIEF DESCRIPTION OF DRAWINGS

FIG. 1 is a schematic architectural diagram of a communications system according to an embodiment of the present disclosure;

FIG. 2 is a schematic flowchart of a communications method according to an embodiment of the present disclosure;

DESCRIPTION OF EMBODIMENTS

Figure 3:
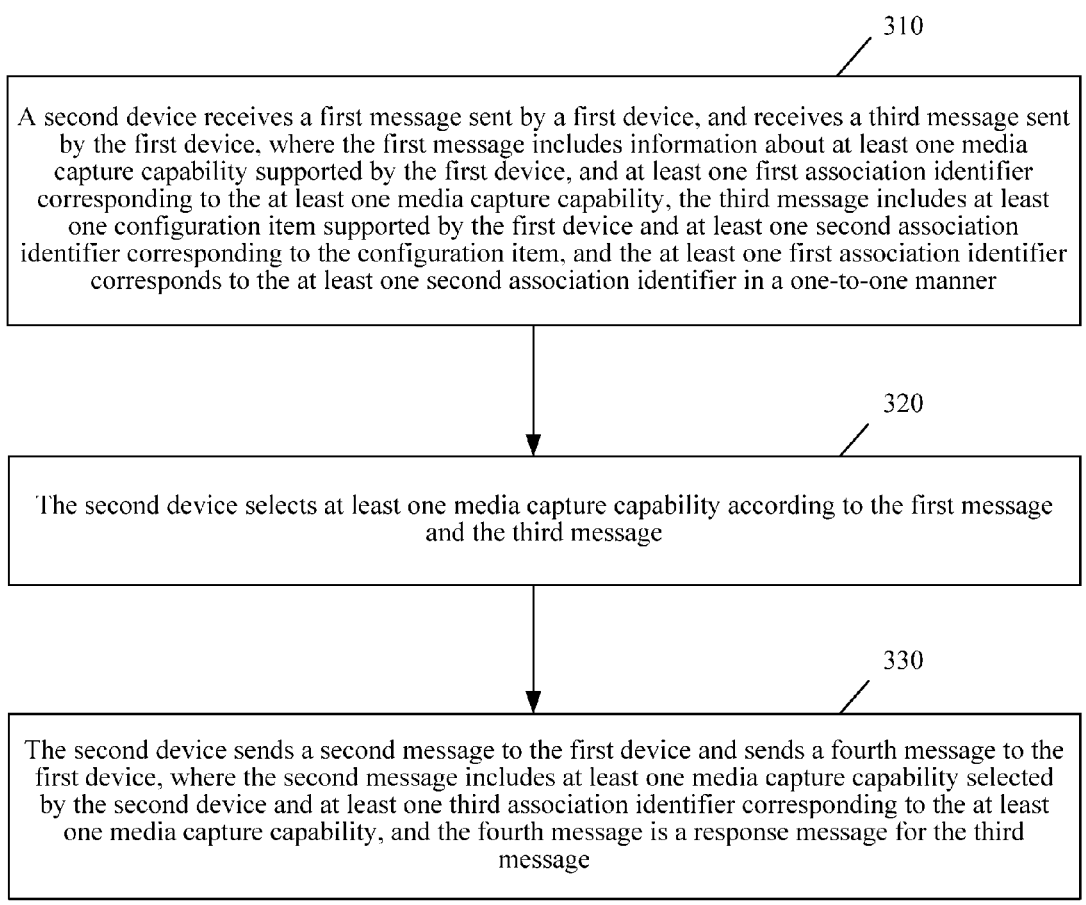
FIG. 3 is a schematic flowchart of a communications method according to another embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure are applicable to video conferencing systems, including a point-to-point conferencing system and a multipoint conferencing system. It should be understood that, in the multipoint conferencing system, generally, when communication is performed among three or more sites, an MCU needs to be used to control and forward media streams. In the point-to-point conferencing system, communication is directly performed between two sites without using an MCU, and no MCU needs to be involved.

FIG. 1 is a schematic architectural diagram of a video conferencing system 100 according to an embodiment of the present disclosure. In this embodiment, a multipoint conferencing system is used as an example for description.

The video conferencing system 100 includes a terminal device 110, a terminal device 120, a terminal device 130, a terminal device 140, and an MCU 150. The video conferencing system 100 may provide a more real video communication effect by means of multi-camera acquisition and multi-screen display. In the video conferencing system 100, the MCU 150 is a device responsible for call signaling processing, conference control, video core switching, audio mixing, video/audio adaptation, and screen splitting processing. The terminal devices 110 to 140 may be site terminals of the video conferencing system 100 located in different sites. Any one of the terminal devices 110 to 140 mainly includes a video codec module, an audio codec module, a signaling module, a control module, a configuration module, other functional modules, and the like, and is mainly used to receive a call from and initiate a call to a remote terminal device, encode video and audio streams collected by a local camera and a local microphone, send the encoded video and audio streams to the remote terminal device, and decode video and audio streams from a remote end, and output the decoded streams to a local display and a local loudspeaker.

It should be understood that, when the video conferencing system 100 in this embodiment of the present disclosure is used in a point-to-point conferencing system, the MCU 150 may be omitted.

For ease of description, FIG. 1 shows only first terminal devices 110 to 140, and a person skilled in the art should understand that, the video conferencing system 100 may include more terminal devices or fewer terminal devices. According to this embodiment of the present disclosure, one terminal device may communicate with multiple terminal communication devices using one MCU, or one device may communicate with multiple terminal devices using multiple MCUs, or one terminal device may directly communicate with another terminal device, or one MCU may communicate with multiple terminal devices.

FIG. 2 is a schematic flowchart of a communications method according to an embodiment of the present disclosure. The method in FIG. 2 is executed by the terminal devices 110 to 140 or MCU 150 in FIG. 1, and includes the following content.

Step 210: A first device sends a first message to a second device, and sends a third message to the second device, where the first message includes information about at least one media capture capability supported by the first device, and one or more first association identifiers corresponding to the at least one media capture capability, the third message includes at least one configuration item supported by the first device and at least one second association identifier corresponding to the configuration item, and the at least one first association identifier corresponds to the at least one second association identifier in a one-to-one manner.

For example, the media capture capability may refer to a capability of a terminal device for capturing media or a capability of an MCU for acquiring media (such as an audio and a video), and the information about the media capture capability may include spatial information, an aspect ratio, a text description, or the like of media. The configuration item may include multiple capabilities, where the capability may refer to a media transmission capability of a terminal device, for example, an encoding mode, a bit rate, or a bandwidth. It should be understood that, the media capture capability and the configuration item may use a same identifier, or association identifiers may be used such that the media capture capability and the configuration item correspond to each other.

Step 220: The first device receives a second message sent by the second device, and receives a fourth message sent by the second device, where the second message includes at least one media capture capability that is selected by the second device according to the first message and the third message, and at least one third association identifier corresponding to the at least one media capture capability, and the fourth message is a response message for the third message.

Further, the first device notifies the second device of the information about the media capture capability supported by the first device and the corresponding first association identifier, and the capability configuration item supported by the first device and the corresponding second association identifier. The second device selects, according to the first message and the third message, a combination of a media capture capability and a configuration item that the second device wants to receive, sends the selected media capture capability using the second message, and marks the selected media capture capability using the third association identifier, where the third association identifier is selected according to a corresponding relationship or an association relationship between the first association identifier and the second association identifier.

In other words, the second device may select, from the at least one media capture capability supported by the first device, at least one media capture capability using the foregoing corresponding relationship or association relationship, and notify the first device of the selected at least one media capture capability such that the first device and the second device transmit media streams using the selected at least one media capture capability and the configuration item.

It should be understood that, the at least one first association identifier may be respectively the same as the at least one second association identifier, or the at least one first association identifier may be respectively different from the at least one second association identifier, and the at least one first association identifier has a mapping relationship, a corresponding relationship, or an association relationship with the at least one second association identifier and the at least one third association identifier.

It should be understood that, the foregoing first message, second message, third message, and fourth message may be multimedia transfer protocol messages, for example, H.323 protocol messages.

According to this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the at least one first association identifier or the at least one second association identifier.

It should be understood that, it may be that the first association identifier and the second association identifier are the same, and the third association identifier is a subset of the at least one first association identifier or the at least one second association identifier, or it may be that the at least one first association identifier is respectively the same as the at least one second association identifier, or the third association identifier is a subset of the at least one first association identifier or the at least one second association identifier.

Optionally, in another embodiment, before sending, by a first device, a first message to a second device, and sending a third message to the second device, the method in FIG. 1 further includes sending, by the first device, a first call setup message to the second device, where the first call setup message includes a parameter used to indicate that a CLUE message is supported, and receiving, by the first device, a second call setup message sent by the second device, where the second call setup message includes a parameter used to indicate that a CLUE message is supported.

It should be understood that, a parameter may be set in a first call setup message. For example, a CLUE capability (CLUEControlCapability) parameter may be set in a message in the H.323 protocol suite. Alternatively, another manner may also be used. The call setup message may be a message used for connection or a call alerting message.

Because the parameter used to indicate that a CLUE message is supported is used in a call setup process, the second device can determine that CLUE is used in a subsequent capability negotiation process in order to be compatible with an existing multimedia transfer protocol (such as the H.323 protocol) or avoid affecting the existing protocol.

According to this embodiment of the present disclosure, the first call setup message and the second call setup message are H.225 protocol messages in the H.323 protocol suite.

It should be understood that, the first message may be a general H.245 protocol message, where the first message is used by the first device to announce a media capture capability. The second message may be a general H.245 protocol message, where the second message is used by the second device to set a media capture capability. The third message may be an H.245 terminal capability set message, and the fourth message may be an H.245 terminal capability set acknowledgment message.

Optionally, in another embodiment, the method in FIG. 2 further includes sending, by the first device, a fifth message to the second device according to the second message, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier in a one-to-one manner, receiving, by the first device, a sixth message sent by the second device, where the sixth message is a response message for the fifth message, and sending, by the first device, a corresponding media stream on the at least one logical channel according to the sixth message.

Because a logical channel is enabled and a corresponding media stream is sent, the first device can send information of multiple media streams to the second device, and therefore, a telepresence effect can be implemented.

It should be understood that, the third association identifier or the fourth association identifier may be the same as the first association identifier and the second association identifier, or may have a mapping relationship with the first association identifier and the second association identifier.

Optionally, in another embodiment, the method in FIG. 2 further includes sending, by the first device, a first termination message to the second device, where the first termination message includes a fourth association identifier corresponding to at least one to-be-terminated logical channel, and the first termination message is used to request to terminate the at least one to-be-terminated logical channel, and receiving, by the first device, a second termination message sent by the second device, where the second termination message is a response message for the first termination message.

It should be understood that, the first termination message may be a message used to disable a logical channel, for example, may be an H.245 logical channel termination message. The first termination message may also be a message for terminating media data transmission, for example, all related capability parameters except an identifier in the first message or the third message may be set to zero.

Optionally, in another embodiment, before sending, by a first device, a first message to a second device, and sending a third message to the second device, the method in FIG. 2 further includes sending, by the first device, a first version message to the second device, where the first version message is used to indicate a CLUE version supported by the first device, and receiving, by the first device, a second version message sent by the second device, where the second version message is used to indicate a CLUE version supported by the second device.

It should be understood that, the first version message and the second version message each may include information that indicates a version and an extension. Because the first device and the second device notify each other of information about a supported CLUE version, the first device and the second device can use a same CLUE version in order to implement capability negotiation.

Optionally, in another embodiment, after receiving, by the first device, a second message sent by the second device, and receiving a fourth message sent by the second device, the method in FIG. 2 further includes receiving, by the first device, a second update message sent by the second device, where the second update message includes at least one to-be-updated media capture capability determined by the second device and at least one third association identifier corresponding to the at least one to-be-updated media capture capability, and sending, by the first device, an updated media stream according to the second update message.

Because the first device receives the second update message sent by the second device and receives the updated media stream, when a capture capability to be selected by the second device changes, an updated media stream can be sent according to a selected updated capture capability.

Optionally, in another embodiment, before receiving, by the first device, a second update message sent by the second device, the method in FIG. 2 further includes sending, by the first device, a first update message to the second device, where the first update message includes information about at least one to-be-updated media capture capability, and at least one first association identifier corresponding to the at least one to-be-updated media capture capability.

Because the first device sends the first update message to the second device, and the second device sends a reply to the first device, the first device can provide changed capture capability information to the second device, and the second device determines a changed capture capability. Therefore, the first device can send a media stream to the second device according to an updated capture capability.

Optionally, in another embodiment, the method in FIG. 2 further includes sending, by the first device, a first update message and a third update message to the second device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item, receiving, by the first device, a second update message and a fourth update message that are sent by the second device, where the second update message includes at least one to-be-updated media capture capability determined by the second device, and at least one third association identifier corresponding to the at least one to-be-updated media capture capability, and the fourth update message is a response message for the third update message, sending, by the first device, a fifth update message to the second device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item, receiving, by the first device, a sixth update message sent by the second device, where the sixth update message is a response message for the fifth update message, and sending, by the first device, a corresponding media stream on at least one updated logical channel according to the sixth update message.

It should be understood that, when the first device and the second device are in a particular situation, for example, when a bandwidth change or an increase or a decrease in a quantity of cameras occurs between two communication parties, the first device needs to send a third update message, where the third update message is used to update the third message. After negotiation of an updated capability is completed, the first device sends a media stream to the second device according to the updated capture capability, thereby implementing a flexible multi-stream media data transmission mechanism.

Optionally, in another embodiment, the method in FIG. 2 further includes receiving, by the first device, a sixth message sent by the second device, and receiving an eighth message sent by the second device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier, selecting, by the first device, at least one media capture capability according to the sixth message and the eighth message, sending, by the first device, a seventh message to the second device, and sending a ninth message to the second device, where the seventh message includes the at least one media capture capability selected by the first device, and at least one seventh association identifier corresponding to the at least one media capture capability selected by the first device, and the ninth message is a response message for the eighth message, receiving, by the first device, a tenth message sent by the second device, where the tenth message includes at least one eighth association identifier corresponding to at least one configuration item selected by the first device, the tenth message is used to request to enable at least one logical channel corresponding to the eighth association identifier, and the at least one eighth association identifier respectively corresponds to the at least one seventh association identifier, sending, by the first device, an eleventh message to the second device, where the eleventh message is a response message for the tenth message, and receiving, by the first device, on the at least one logical channel, a media stream sent by the second device.

It should be understood that, the first device hence accepts capability negotiation initiated by the second device, and the first device receives the media stream sent by the second device. In other words, a bidirectional path is established between the first device and the second device. The first device may send a media stream to the second device, and the second device may also send a media stream to the first device. Therefore, both the first device and the second device implement capability negotiation and media data transmission.

According to this embodiment of the present disclosure, the first device is an MCU.

For example, in a multipoint conferencing system, an MCU may receive terminal capability set messages (for example, terminalCapabilitySet) and request messages (for example, CLUERequest) from multiple terminals, and construct capture data of the MCU according to information acquired from the messages. Generally, after receiving information from all the terminals, the MCU sends a terminal capability set message and a request message of the MCU, or in some cases (for example, in a fast boot), the MCU may send a terminal capability set message and a request message first, and after another terminal joins, update capture data using the foregoing update method.

It should be understood that, alternatively, the first device may be a terminal device.

According to another embodiment of the present disclosure, the first device and the second device support CLUE, and the first message, the second message, the third message, and the fourth message are H.245 protocol messages in the H.323 protocol suite. For example, the first message is a request message, the second message is a request message, the third message is a terminal capability set message, and the fourth message is a terminal capability set acknowledgment message.

Because a device that supports the H.323 protocol suite is used, capability negotiation of multiple media streams is implemented using CLUE when the H.323 protocol is used, thereby further implementing transmission of multiple media streams.

It should be understood that, the first message, the second message, the third message, and the fourth message may be messages in other protocols for negotiating the capture capability and the configuration item.

FIG. 3 is a schematic flowchart of a communications method according to another embodiment of the present disclosure. The method in FIG. 3 is executed by a second terminal device 120, and includes the following content. The embodiment in FIG. 3 corresponds to the embodiment in FIG. 2, and detailed descriptions are properly omitted herein. The method may include the following steps.

Step 310: A second device receives a first message sent by a first device, and receives a third message sent by the first device, where the first message includes information about at least one media capture capability supported by the first device, and at least one first association identifier corresponding to the at least one media capture capability, the third message includes at least one configuration item supported by the first device and at least one second association identifier corresponding to the configuration item, and the at least one first association identifier corresponds to the at least one second association identifier in a one-to-one manner.

Step 320: The second device selects at least one media capture capability according to the first message and the third message.

Step 330: The second device sends a second message to the first device and sends a fourth message to the first device, where the second message includes at least one media capture capability selected by the second device and at least one third association identifier corresponding to the at least one media capture capability, and the fourth message is a response message for the third message.

According to this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the first association identifier or the second association identifier.

Optionally, in another embodiment, before receiving, by a second device, a first message sent by a first device, and receiving a third message sent by the first device, the method in FIG. 3 further includes receiving, by the second device, a first call setup message sent by the first device, where the first call setup message includes a parameter used to indicate that a CLUE message is supported, and sending, by the second device, a second call setup message to the first device, where the second call setup message includes a parameter used to indicate that a CLUE message is supported.

According to this embodiment of the present disclosure, the first call setup message and the second call setup message are H.225 protocol messages in the H.323 protocol suite.

Optionally, in another embodiment, after sending, by the second device, a second message to the first device, and sending a fourth message sent to the first device, the method in FIG. 3 further includes receiving, by the second device, a fifth message that is sent by the first device according to the second message, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier, sending, by the second device, a sixth message to the first device, where the sixth message is a response message for the fifth message, and receiving, by the second device, on the at least one logical channel, a corresponding media stream that is sent by the first device according to the sixth message.

Optionally, in another embodiment, the method in FIG. 3 further includes receiving, by the second device, a first termination message sent by the first device, where the first termination message includes a fourth association identifier corresponding to at least one to-be-terminated logical channel, and the first termination message is used to request to terminate the at least one to-be-terminated logical channel, and sending, by the second device, a second termination message to the first device, where the second termination message is a response message for the first termination message.

Optionally, in another embodiment, before receiving, by a second device, a first message sent by a first device, and receiving a third message sent by the first device, the method in FIG. 3 further includes receiving, by the second device, a first version message sent by the first device, where the first version message is used to indicate a CLUE version supported by the first device, and sending, by the second device, a second version message to the first device, where the second version message is used to indicate a CLUE version supported by the second device.

Optionally, in another embodiment, after sending, by the second device, a second message to the first device, and sending a fourth message to the first device, the method further includes sending, by the second device, a second update message to the first device, where the second update message includes at least one to-be-updated media capture capability determined by the second device and at least one third association identifier corresponding to the at least one to-be-updated media capture capability, and receiving, by the second device, an updated media stream that is sent by the first device according to the second update message.

Optionally, in another embodiment, before sending, by the second device, a second update message to the first device, the method in FIG. 3 further includes receiving, by the second device, a first update message sent by the first device, where the first update message includes information about at least one to-be-updated media capture capability, and at least one first association identifier corresponding to the at least one to-be-updated media capture capability.

Optionally, in another embodiment, the method in FIG. 3 further includes receiving, by the second device, a first update message and a third update message that are sent by the first device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item, sending, by the second device, a second update message and a fourth update message to the first device, where the second update message includes at least one to-be-updated media capture capability determined by the second device and at least one first association identifier corresponding to the at least one to-be-updated media capture capability, and the fourth update message is a response message for the third update message, receiving, by the second device, a fifth update message that is sent by the first device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item, sending, by the second device, a sixth update message to the first device, where the sixth update message is a response message for the fifth update message, and receiving, by the second device, on at least one updated logical channel, a corresponding media stream that is sent by the first device according to the sixth update message.

Optionally, in another embodiment, after sending, by the second device, a second message to the first device, and sending a fourth message to the first device, the method in FIG. 3 further includes sending, by the second device, the sixth message to the first device, and sending an eighth message to the first device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier, receiving, by the second device, a seventh message sent by the first device, and receiving a ninth message sent by the first device, where the seventh message includes at least one media capture capability selected by the first device and at least one seventh association identifier corresponding to the at least one media capture capability selected by the first device, and the ninth message is a response message for the eighth message, sending, by the second device, a tenth message to the first device, where the tenth message includes at least one configuration item selected by the first device and at least one eighth association identifier corresponding to the at least one configuration item selected by the first device, the tenth message is used to request to enable at least one logical channel corresponding to the eighth association identifier, and the at least one eighth association identifier respectively corresponds to the at least one seventh association identifier, receiving, by the second device, an eleventh message sent by the first device, where the eleventh message is a response message for the tenth message, and sending, by the second device, a media stream on the at least one logical channel to the first device.

According to this embodiment of the present disclosure, the first device is an MCU.

According to this embodiment of the present disclosure, the first device and the second device support CLUE, and the first message, the second message, the third message, and the fourth message are H.245 protocol messages in the H.323 protocol suite.

According to this embodiment of the present disclosure, the first message is a request message, the second message is a terminal capability set message, the third message is a request message, and the fourth message is a terminal capability set acknowledgment message.

Figure 4:
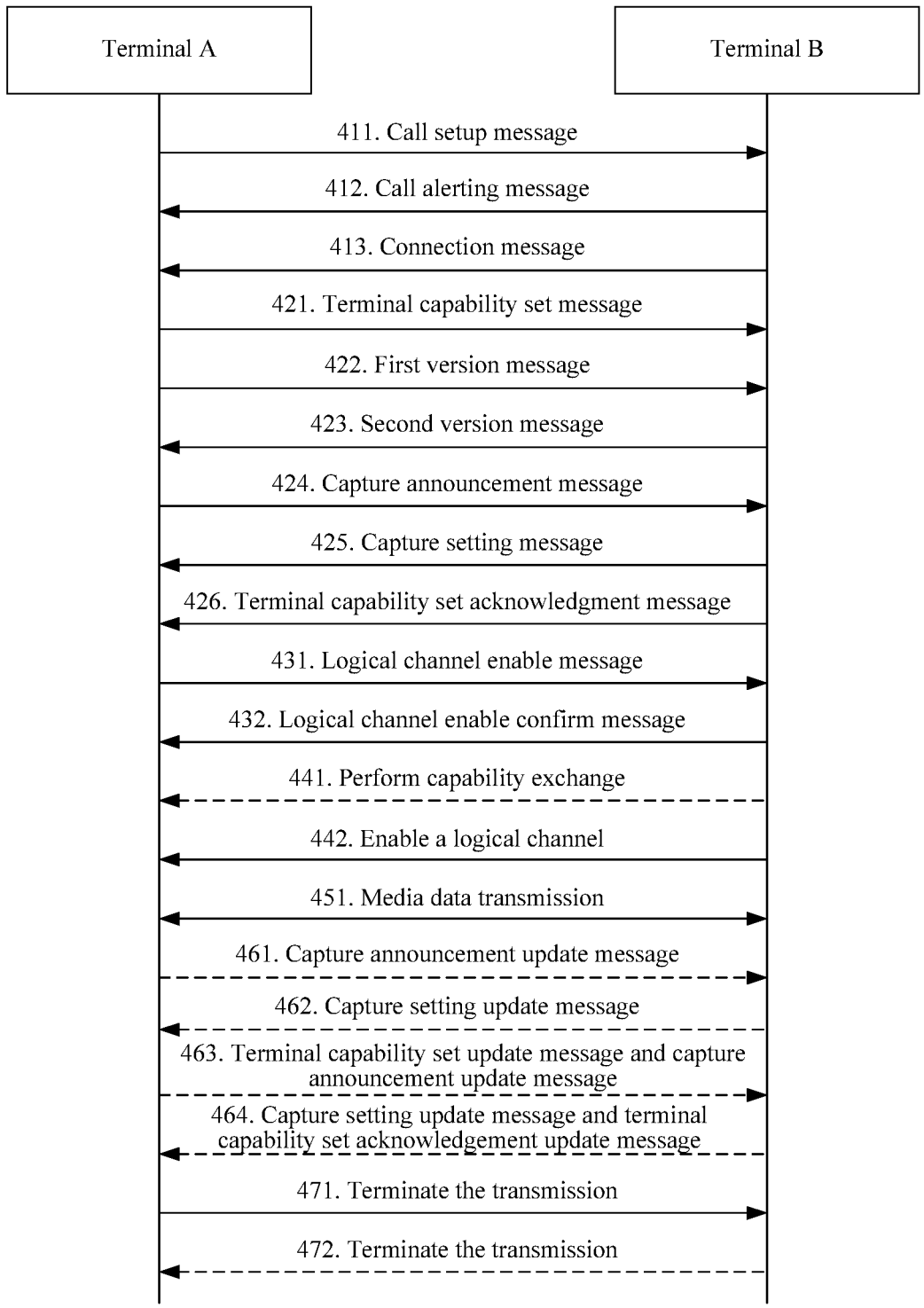
FIG. 4 is a schematic flowchart of a communications method according to still another embodiment of the present disclosure.

FIG. 4 is a schematic flowchart of a method for negotiating a media capability according to another embodiment of the present disclosure. This flowchart shows an interaction relationship between a terminal A and a terminal B. The method in FIG. 4 is an example of the methods in FIG. 2 and FIG. 3, and detailed descriptions are omitted herein. In this embodiment, the terminal A is used as a first device, the terminal B is used as a second device, a first message is a capture announcement message, a second message is a capture setting message, a third message is a terminal capability set message, and a fourth message is a terminal capability set acknowledgment message. In this embodiment, descriptions are provided using an example in which CLUE is used, and a common multimedia transfer protocol is the H.323 protocol.

Steps 411 to 413 below are a process of setting up a call between the terminal A and the terminal B. In this process, a media control channel may be established between the terminal A and the terminal B using an established call signaling channel between the terminal A and the terminal B.

Step 411: The terminal A sends a call setup message to the terminal B.

For example, after the call signaling channel between the terminal A and the terminal B is established, the terminal A may send a call setup message on the call signaling channel to the terminal B. For example, the call setup message may use an H.225 protocol message format, and a difference lies in that the call setup message further includes an extended capability parameter, for example, a CLUE capability (CLUEControlCapability) parameter. The extended capability parameter indicates that the terminal A and the terminal B support the CLUE protocol. If the call setup message includes the extended capability parameter, it indicates that the CLUE protocol is used in a current call, and if the call setup message does not include the extended capability parameter, it indicates that the CLUE protocol is not used in a current call, and the following steps are not performed.

Specific content of the extended capability parameter is shown in Table 1.

TABLE 1

| | |
|---|---|
| Capability name | CLUEcontrolcapability |
| Capability class | Control protocol |
| Capability identifier type | Standard |
| Capability identifier value | {itu-t (0) recommendation (0) h (8) CLUECorrelationCapability (i) 0} |
| Maxbitrate | This field shall not be included. |
| Collapsing | This field shall not be included. |
| Noncollapsing | This field shall not be included. |
| Noncollapsingraw | This field shall not be included. |
| Transport | This field shall not be included. |

Step 412: The terminal B sends a call alerting message including an extended capability parameter to the terminal A.

For example, the terminal A may send the call alerting message on the call signaling channel to the terminal B. The call alerting message indicates that the terminal B receives the call setup message and determines to communicate with the terminal A using the CLUE protocol. For example, the call alerting message is an H.225 protocol message.

Step 413: The terminal B sends a connect message to the terminal A, where the message indicates that a call connection is established between the terminal B and the terminal A, that is, a media control channel is established between the terminal B and the terminal A.

Steps 421 to 425 below represent a process of performing, by the terminal A, capability exchange with the terminal B. In this process, the terminal A and the terminal B may negotiate, using the established media control channel and H.245 protocol messages, a multi-stream control capability parameter needed by the CLUE protocol.

Step 421: The terminal A sends a terminal capability set message to the terminal B.

For example, the terminal A sends the terminal capability set (TerminalCapabilitySet) message to the terminal B using the established media control channel. The terminal capability set message uses an H.245 terminal capability set message format. The terminal capability set message includes at least one configuration item (for example, four configuration items in this embodiment) indicating at least one capability supported by the terminal A, and different from a conventional H.245 terminal capability set message, in the terminal capability set message in this embodiment, the configuration item may include multiple capabilities, and a CLUEEncodingCorrelation parameter may be added to a configuration item a, a configuration item b, a configuration item c, and a configuration item e, where the CLUEEncodingCorrelation parameter may include an Encoding ID parameter. The Encoding ID parameter is a specific example of the identifier in the specification, and is used to associate the configuration item with a capture. For example, a configuration item and a capture that have a same Encoding ID parameter are associated. It should be understood that, the configuration item and the capture may also use associated identifiers rather than using a same parameter. A logical channel corresponding to the same Encoding ID parameter is associated with the configuration item and the capture. Descriptions of the CLUEEncodingCorrelation parameter are shown in Table 2. Descriptions are shown in Table 3.

TABLE 2

| Capability name | CLUEencoding correlation |
|---|---|
| Capability class | Control protocol |
| Capability identifier type | Standard |
| Capability identifier value | {itu-t(0) recommendation(0) h(8) CLUECorrelationCapability(i) 0} |
| Maxbitrate | This field shall not be included. |
| Collapsing | This field contains the Encoding ID parameter. |
| Noncollapsing | This field shall not be included. |
| Noncollapsingraw | This field shall not be included. |
| Transport | This field shall not be included. |

TABLE 3

| Parameter name | Encoding ID |
|---|---|
| Parameter description | This parameter allows an endpoint to correlate a logical channel with a particular CLUE capture encoding. It contains the "encodingID" associated with the capture whose contents the logical channel contains. This ensures a linkage between a configured CLUE capture and encoding to the resultant media stream. |
| Parameter identifier value | |
| Parameter status | Mandatory |
| Parameter type | OcterString |
| Supersedes | |

For example, a TerminalCapabilitySet message to which the parameter has been added includes the following content:
    configuration item a: CLUEEncodingCorrelation: EncodingID=1;
    configuration item b: CLUEEncodingCorrelation: EncodingID=2;
    configuration item c;
    configuration item d: CLUEEncodingCorrelation: EncodingID=3; and
    configuration item e: CLUEEncodingCorrelation: EncodingID=4.

Step 422: The terminal A sends a first version message to the terminal B, where the message indicates a version and an extension of the CLUE protocol that are supported by the terminal A.

For example, the terminal A may send a first version message to the terminal B using the media control channel, where the first version message may be a CLUE request (CLUERequest) message, and the message uses an H.245 protocol message format.

Step 423: The terminal B sends a second version message to the terminal A, where the second version message indicates a version and an extension that are supported by the terminal B.

For example, the terminal B may send a second version message to the terminal A using the media control channel, where the second version message may be a CLUERequest message, and the message uses an H.245 request message format.

Step 424: The terminal A sends a capture announcement message to the terminal B.

For example, the terminal A may send the capture announcement message to the terminal B using the media control channel. In this embodiment, the capture announcement message includes information about three media capture capabilities supported by the terminal A. The capture announcement message may be a CLUERequest message, and uses an H.245 request message format. Information about each media capture capability includes one or more EncodingID parameters. It should be understood that, an association identifier corresponding to the identifier in the configuration item may also be used. For example, the capture announcement message includes the following content.
    capture i: EncodingID=1;
    capture ii: EncodingID=2, EncodingID=4; and
    capture iii: EncodingID=3.

Step 425: The terminal B sends a capture setting message to the terminal A, where the message is a CLUERequest message. For example, the terminal B may send the capture setting message to the terminal A using the media control channel. In this embodiment, the capture setting message indicates information about two media capture capabilities set by the terminal B, where information about each media capture capability includes an association identifier, and the capture setting message may be a CLUERequest message, and uses an H.245 request message format. The capture setting message includes:
    capture i: EncodingID=1; and
    capture ii: EncodingID=2.

Step 426: The terminal B sends a terminal capability set acknowledgment message to the terminal A, where the message indicates that the terminal B determines that the terminal capability set message sent by the terminal A is received.

For example, the terminal B may send the terminal capability set acknowledgment message to the terminal A using the media control channel. In this embodiment, the terminal capability set acknowledgment message may use an H.245 terminal capability set acknowledgment message format.

The terminal B may determine, according to EncodingID=1 and EncodingID=2 that respectively correspond to the capture i and capture ii set in the capture setting message, that at least one configuration item selected by the terminal B is the configuration item a and the configuration item b. For the configuration item c that includes no association identifier, in accordance with a conventional H.245 communications method, the CLUE protocol is not used. The terminal B then sends a TerminalCapabilitySetAck message to the terminal A, where the message is used to respond to the TerminalCapabilitySet message.

Optionally, the terminal capability set acknowledgment message may include the following content.
    configuration item a: CLUEEncodingCorrelation: EncodingID=1;
    configuration item b: CLUEEncodingCorrelation: EncodingID=2; and
    configuration item c.

Steps 431 and 432 below represent a process of establishing a media data transmission channel. In this process, the terminal A and the terminal B may negotiate, using the established media control channel and H.245 messages, a multi-stream control capability parameter needed by the CLUE protocol.

Step 431: The terminal A sends a logical channel enable message to the terminal B.

For example, the terminal A may send the logical channel enable message to the terminal B using the media control channel. In this embodiment, the terminal capability set acknowledgment message may use an H.245 request message format.

The logical channel enable message includes configuration items, where some configuration items correspond to an Encoding ID parameter, and some configuration items do not include an Encoding ID parameter. For the configuration items that do not include the Encoding ID, the terminal A enables a logical channel using a standard H.245 protocol. For the configuration items that correspond to the Encoding ID, the terminal A enables a logical channel according to only the Encoding ID in the received capture setting message. The logical channel enable message includes the following content.

configuration item a: EncodingID=1;
configuration item b: EncodingID=2; and
configuration item c.

For the configuration item c that does not include the Encoding ID, the terminal A enables a logical channel using standard H.245. For the configuration item a and the configuration item b that correspond to the Encoding ID, because the capture setting message sent by the terminal B and received by the terminal A includes Encoding IDs of corresponding captures, the device enables logical channels for the configuration items a and b that correspond to the Encoding IDs of the captures.

Step 432: The terminal B sends a logical channel enable confirm message to the terminal A.

For example, the terminal B may send the logical channel enable confirm message to the terminal A using the media control channel. In this embodiment, the logical channel enable confirm message may use an H.245 request message format.

For example, the logical channel enable confirm message is used to confirm enabling of logical channels corresponding to EncodingID=1 and EncodingID=2.

Optionally, the logical channel enable confirm message may include the following content.

configuration item a: EncodingID=1;
configuration item b: EncodingID=2; and
configuration item c.

Up to now, a logical channel from the terminal A to the terminal B is enabled, and the terminal A can send a media stream to the terminal B using the foregoing logical channel.

Optionally, in another embodiment, the embodiment in FIG. 4 may further include steps 441 and 442 below such that the terminal B can perform capability exchange with the terminal A, and enable a logical channel from the terminal B to the terminal A such that the terminal B can transmit a media stream to the terminal A.

Step 441: The terminal B performs capability exchange with the terminal A.

Step 442: The terminal B enables a logical channel to the terminal A.

It should be understood that, specific steps in 441 and 442 are similar to the manner of communicating, by the terminal A, with the terminal B, and details are not described herein again. After step 442, bidirectional channels are established between the terminal A and the terminal B, and the terminal A and the terminal B can send media data to each other.

Step 451: The terminal A sends media data to the terminal B using an enabled logical channel from the terminal A to the terminal B, and the terminal B sends media data to the terminal A using an enabled logical channel from the terminal B to the terminal A.

Step 461: If the terminal A needs to update the capture announcement message, the terminal A sends a capture announcement update message to the terminal B, and after receiving the capture announcement update message, the terminal B determines a capture in the capture setting message according to an Encoding ID in the message.

Step 462: The terminal B sends a capture setting update message to the terminal A.

Step 463: When transmission bandwidth between the terminal A and the terminal B changes, or cameras are added or reduced, the terminal A needs to send a TerminalCapabilitySet update message and a capture announcement update message to the terminal B, and then the terminal B determines, according to the TerminalCapabilitySet update message and the capture announcement update message and using an Encoding ID, a capture in the capture setting message that needs to be replied. It should be understood that, step 463 is optional, and the sequence of step 463 and steps 461 and 462 is interchangeable, that is, step 463 may be performed before or after steps 461 and 462.

Step 464: The terminal B sends a capture setting update message and a TerminalCapabilitySetAck update message to the terminal A, where optionally, the capture setting update message may include a configuration item and an Encoding ID corresponding to the configuration item, and the TerminalCapabilitySetAck update message is used to respond to the TerminalCapabilitySet update message.

Step 471: The terminal A terminates one or more media data logical channels to the terminal B, where the terminal A may set another capability corresponding to a specified Encoding ID parameter in a CLUERequest message or a TerminalCapabilitySet message to 0, and then send the CLUERequest message or the TerminalCapabilitySet message. In this case, the terminal A may send a TerminalCapabilitySet message or a capture announcement message to the terminal B again, to perform capability exchange similar to that of 421 to 432 if the terminal A still needs to transmit media data to the terminal B.

Alternatively, the terminal A may send a CloseLogicalChannel message to disable the channel. In this case, the terminal A needs to enable the logical channel again, or even set up a call again, that is, send a call setup message if the terminal A still needs to send media data to the terminal B.

Step 472: The terminal B terminates one or more media data logical channels to the terminal A, where the terminal B may use a same or similar manner to terminate media data transmission from the terminal B to the terminal A. It should be understood that step 472 is optional.

Figure 5:
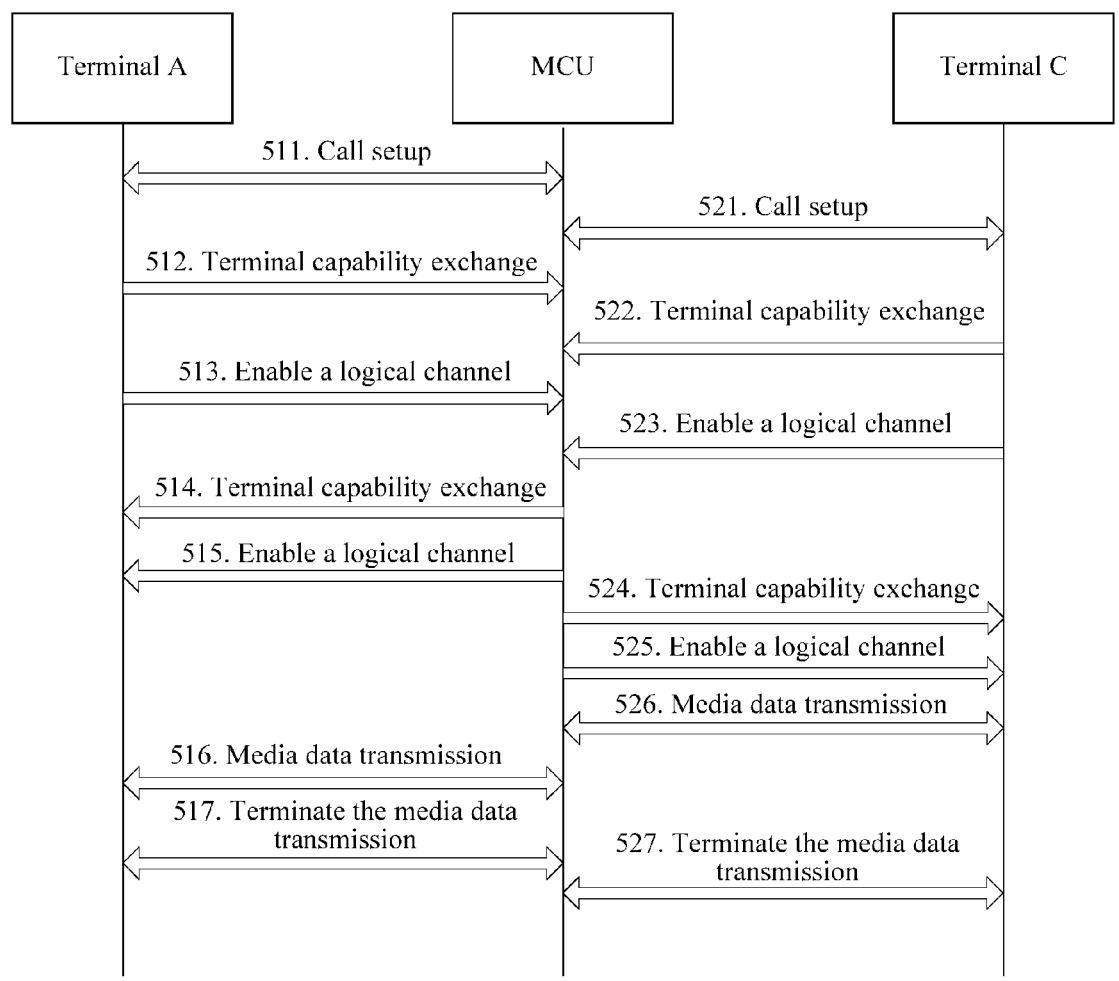
FIG. 5 is a schematic flowchart of a communications method according to yet another embodiment of the present disclosure.

FIG. 5 is a schematic diagram of a communications method according to yet another embodiment of the present disclosure. This flowchart shows interaction relationships between a terminal A and an MCU and between a terminal C and the MCU, where the MCU may be used as a terminal device, and the difference lies in that, the MCU can interact with multiple devices. The method in FIG. 5 is an example of the methods in FIG. 2 and FIG. 3. Some steps in the method in FIG. 5 correspond to some steps in the method in FIG. 4, and implementation manners thereof are same or similar. A person skilled in the art can implement the method of the embodiment in FIG. 5 according to the descriptions.

Step 511: The terminal A sets up a call with the MCU. This step corresponds to step 411 to step 413 in FIG. 4, and has a same or similar implementation manner as step 411 to step 413.

Step 521: The terminal C sets up a call with the MCU similar to step 511.

Step 512: The terminal A performs terminal capability exchange with the MCU. This step corresponds to step 421 to step 426 in FIG. 4, and has a same or similar implementation manner as step 421 to step 426.

Step 513: The terminal A enables a logical channel to the MCU. This step corresponds to step 431 and step 432 in FIG. 4, and has a same or similar implementation manner as step 431 and step 432.

Step 514 and step 515, step 522 and step 523, and step 524 and step 525 are similar to step 512 and step 513, and the difference lies in that:

Step 514 and step 515: The MCU performs terminal capability exchange with the terminal A, and the MCU enables a logical channel to the terminal A.

Step 522 and step 523: The terminal C performs terminal capability exchange with the MCU, and the terminal C enables a logical channel to the MCU.

Step 524 and step 525: The MCU performs terminal capability exchange with the terminal C, and the MCU enables a logical channel to the terminal C.

In step 516 and step 526, media data transmission is performed, which may be media data transmission between the MCU and the terminal A and between the MCU and the terminal C. Furthermore step 516 and step 526 correspond to step 451 in FIG. 4.

In step 517 and step 527, termination of media data transmission is performed. Step 517 and step 527 correspond to step 471 and step 472 in FIG. 4.

Figure 6:
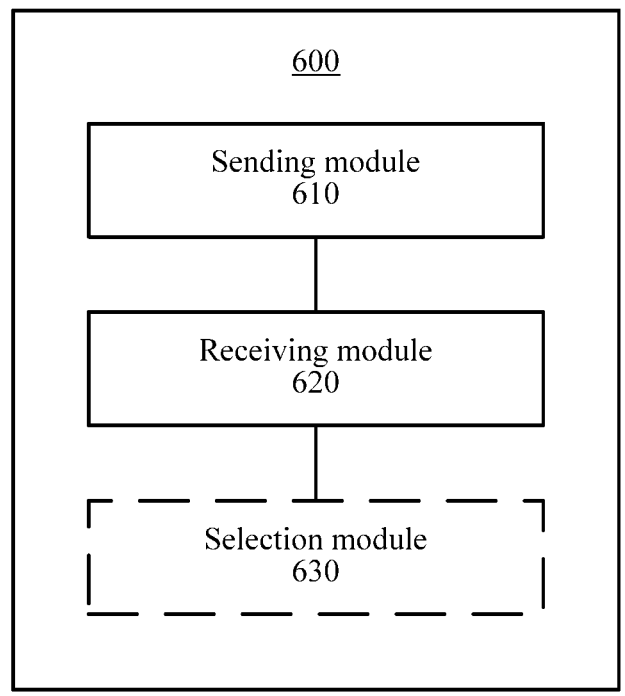
FIG. 6 is a schematic structural diagram of a network device according to another embodiment of the present disclosure.

The device 600 in FIG. 6 includes a sending module 610 configured to send a first message to a second device, and send a third message to the second device, where the first message includes information about at least one media capture capability supported by the device 600, and at least one first association identifier corresponding to the at least one media capture capability, the third message includes at least one configuration item supported by the device 600 and at least one second association identifier corresponding to the configuration item, and the at least one first association identifier corresponds to the at least one second association identifier in a one-to-one manner, and a receiving module 620 configured to receive a second message sent by the second device, and receive a fourth message sent by the second device, where the second message includes at least one media capture capability that is selected by the second device according to the first message and the third message, and at least one third association identifier corresponding to the at least one media capture capability, and the fourth message is a response message for the third message.

In the technical solution of this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the first association identifier or the second association identifier.

Optionally, in another embodiment, the sending module 610 is further configured to send a first call setup message to the second device before sending the first message to the second device and sending the third message to the second device, where the first call setup message includes a parameter used to indicate that a CLUE message is supported, and the receiving module 620 is further configured to receive a second call setup message sent by the second device, where the second call setup message includes a parameter used to indicate that a CLUE message is supported.

According to this embodiment of the present disclosure, the first call setup message and the second call setup message are H.225 protocol messages in the H.323 protocol suite.

Optionally, in another embodiment, the sending module 610 is further configured to send a fifth message to the second device according to the second message after the receiving module 620 receives the second message sent by the second device and receives the fourth message sent by the second device, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier. The receiving module 620 is further configured to receive a sixth message sent by the second device, where the sixth message is a response message for the fifth message, and the sending module 610 sends a corresponding media stream on the at least one logical channel according to the sixth message.

Optionally, in another embodiment, the sending module 610 is further configured to send a first termination message to the second device, where the first termination message includes a fourth association identifier corresponding to at least one to-be-terminated logical channel, and the first termination message is used to request to terminate the at least one to-be-terminated logical channel, and the receiving module 620 is further configured to receive a second termination message sent by the second device, where the second termination message is a response message for the first termination message.

Optionally, in another embodiment, the sending module 610 is further configured to send a first version message to the second device before sending the first message to the second device and the third message to the second device, where the first version message is used to indicate a CLUE version supported by the device 600, and the receiving module 620 is further configured to receive a second version message sent by the second device, where the second version message is used to indicate a CLUE version supported by the second device.

Optionally, in another embodiment, the receiving module 620 is further configured to receive a second update message sent by the second device after receiving the second message sent by the second device and receiving the fourth message sent by the second device, where the second update message includes at least one to-be-updated media capture capability determined by the second device and at least one third association identifier corresponding to the at least one to-be-updated media capture capability, and the sending module 610 is further configured to send an updated media stream according to the second update message.

Optionally, in another embodiment, the sending module 610 is further configured to send a first update message to the second device before the receiving module 620 receives the second update message sent by the second device, where the first update message includes information about at least one to-be-updated media capture capability, and at least one first association identifier corresponding to the at least one to-be-updated media capture capability.

Optionally, in another embodiment, the sending module 610 is further configured to send a first update message and a third update message to the second device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The receiving module 620 is further configured to receive a second update message and a fourth update message that are sent by the second device, where the second update message includes at least one to-be-updated media capture capability determined by the second device, and at least one third association identifier corresponding to the at least one to-be-updated media capture capability, and the fourth update message is a response message for the third update message. The sending module 610 is further configured to send a fifth update message to the second device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The receiving module 620 is further configured to receive a sixth update message sent by the second device, where the sixth update message is a response message for the fifth update message, and the sending module 610 is further configured to send a corresponding media stream on at least one updated logical channel according to the sixth update message.

Optionally, in another embodiment, the device 600 in FIG. 6 further includes a selection module 630, where the receiving module 620 is further configured to receive a sixth message sent by the second device, and receive an eighth message sent by the second device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier. The selection module 630 is configured to select at least one media capture capability according to the sixth message and the eighth message. The sending module 610 is further configured to send a seventh message to the second device, and send a ninth message to the second device, where the seventh message includes the at least one media capture capability selected by the device 600, and at least one seventh association identifier corresponding to the at least one media capture capability selected by the device 600, and the ninth message is a response message for the eighth message. The receiving module 620 is further configured to receive a tenth message sent by the second device, where the tenth message includes at least one eighth association identifier corresponding to at least one configuration item selected by the device 600, the tenth message is used to request to enable at least one logical channel corresponding to the eighth association identifier, and the at least one eighth association identifier respectively corresponds to the at least one seventh association identifier. The sending module 610 is further configured to send an eleventh message to the second device, where the eleventh message is a response message for the tenth message, and the receiving module 620 is further configured to receive, on the at least one logical channel, a media stream sent by the second device.

According to this embodiment of the present disclosure, the device 600 is an MCU.

According to this embodiment of the present disclosure, the device 600 and the second device support CLUE, and the first message, the second message, the third message, and the fourth message are H.245 protocol messages in the H.323 protocol suite.

According to this embodiment of the present disclosure, the first message is a request message, the second message is a terminal capability set message, the third message is a request message, and the fourth message is a terminal capability set acknowledgment message.

For operations and functions of the units of the device 600 for negotiating a media capability, refer to the embodiment in FIG. 2. To avoid repetition, details are not described herein again.

Figure 7:
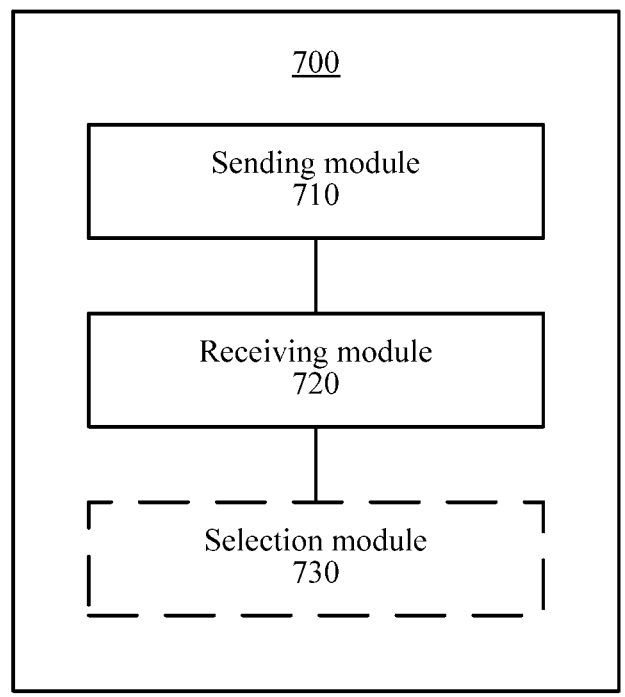
FIG. 7 is a schematic structural diagram of a communications device according to another embodiment of the present disclosure.

The device 700 in FIG. 7 includes a receiving module 720 configured to receive a first message sent by a first device, and receive a third message sent by the first device, where the first message includes information about at least one media capture capability supported by the first device, and at least one first association identifier corresponding to the at least one media capture capability, the third message includes at least one configuration item supported by the first device and at least one second association identifier corresponding to the configuration item, and the at least one first association identifier corresponds to the at least one second association identifier, a selection module 730 configured to select at least one media capture capability according to the first message and the third message, and a sending module 710 configured to send a second message to the first device, and send a fourth message to the first device, where the second message includes the at least one media capture capability selected by the device 700 and at least one third association identifier corresponding to the at least one media capture capability, and the fourth message is a response message for the third message.

In the technical solution of this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the first association identifier or the second association identifier.

Optionally, in another embodiment, the receiving module 720 is further configured to receive a first call setup message sent by the first device before receiving the first message sent by the first device and receiving the third message sent by the first device, where the first call setup message includes a parameter used to indicate that a CLUE message is supported, and the sending module 710 is further configured to send a second call setup message to the first device, where the second call setup message includes a parameter used to indicate that a CLUE message is supported.

According to this embodiment of the present disclosure, the first call setup message and the second call setup message are H.225 protocol messages in the H.323 protocol suite.

Optionally, in another embodiment, the receiving module 720 is further configured to receive a fifth message that is sent by the first device according to the second message after the sending module 710 sends the second message to the first device and sends the fourth message to the first device, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier. The sending module 710 is further configured to send a sixth message to the first device, where the sixth message is a response message for the fifth message, and the receiving module 720 is further configured to receive, on the at least one logical channel, a corresponding media stream that is sent by the first device according to the sixth message.

Optionally, in another embodiment, the receiving module 720 is further configured to receive a first termination message sent by the first device, where the first termination message includes a fourth association identifier corresponding to at least one to-be-terminated logical channel, and the first termination message is used to request to terminate the at least one to-be-terminated logical channel, and the sending module 710 is further configured to send a second termination message to the first device, where the second termination message is a response message for the first termination message.

Optionally, in another embodiment, the receiving module 720 is further configured to receive a first version message sent by the first device before receiving the first message sent by the first device and receiving the third message sent by the first device, where the first version message is used to indicate a CLUE version supported by first device, and the sending module 710 is further configured to send a second version message to the first device, where the second version message is used to indicate a CLUE version supported by the device 700.

Optionally, in another embodiment, the sending module 710 is further configured to send a second update message to the first device after sending the second message to the first device and sending the fourth message to the first device, where the second update message includes at least one to-be-updated media capture capability determined by the device 700 and at least one third association identifier corresponding to the at least one to-be-updated media capture capability, and the receiving module 720 is further configured to receive an updated media stream that is sent by the first device according to the second update message.

Optionally, in another embodiment, the receiving module 720 is further configured to receive a first update message sent by the first device before the sending module 710 sends the second update message to the first device, where the first update message includes information about at least one to-be-updated media capture capability, and at least one first association identifier corresponding to the at least one to-be-updated media capture capability.

Optionally, in another embodiment, the receiving module 720 is further configured to receive a first update message and a third update message that are sent by the first device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The sending module 710 is further configured to send a second update message and a fourth update message to the first device, where the second update message includes at least one to-be-updated media capture capability determined by the device 700 and at least one first association identifier corresponding to the at least one to-be-updated media capture capability, and the fourth update message is a response message for the third update message. The receiving module 720 is further configured to receive a fifth update message that is sent by the first device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The sending module 710 is further configured to send a sixth update message to the first device, where the sixth update message is a response message for the fifth update message, and the receiving module 720 is further configured to receive, on at least one updated logical channel, a corresponding media stream that is sent by the first device according to the sixth update message.

Optionally, in another embodiment, the sending module 710 is further configured to send the sixth message to the first device, and send an eighth message to the first device after sending the second message to the first device and sending the fourth message to the first device, where the sixth message includes information about at least one media capture capability supported by the device 700, and at least one fifth association identifier corresponding to the at least one media capture capability supported by the device 700, the eighth message includes at least one configuration item supported by the device 700 and at least one sixth association identifier corresponding to the at least one configuration item supported by the device 700, and the at least one fifth association identifier corresponds to the at least one sixth association identifier. The receiving module 720 is further configured to receive a seventh message sent by the first device, and receive a ninth message sent by the first device, where the seventh message includes at least one media capture capability selected by the first device and at least one seventh association identifier corresponding to the at least one media capture capability selected by the first device, and the ninth message is a response message for the eighth message. The sending module 710 is further configured to send a tenth message to the first device, where the tenth message includes at least one configuration item selected by the first device and at least one eighth association identifier corresponding to the at least one configuration item selected by the first device, the tenth message is used to request to enable at least one logical channel corresponding to the eighth association identifier, and the at least one eighth association identifier respectively corresponds to the at least one seventh association identifier. The receiving module 720 is further configured to receive an eleventh message sent by the first device, where the eleventh message is a response message for the tenth message, and the sending module 710 is further configured to send a media stream on the at least one logical channel to the first device.

According to this embodiment of the present disclosure, the first device is an MCU.

According to this embodiment of the present disclosure, the first device and the device 700 support CLUE, and the first message, the second message, the third message, and the fourth message are H.245 protocol messages in the H.323 protocol suite.

According to this embodiment of the present disclosure, the first message is a request message, the second message is a terminal capability set message, the third message is a request message, and the fourth message is a terminal capability set acknowledgment message.

For operations and functions of the units of the device 700 for negotiating a media capability, refer to the embodiment in FIG. 3. To avoid repetition, details are not described herein again.

Figure 8:
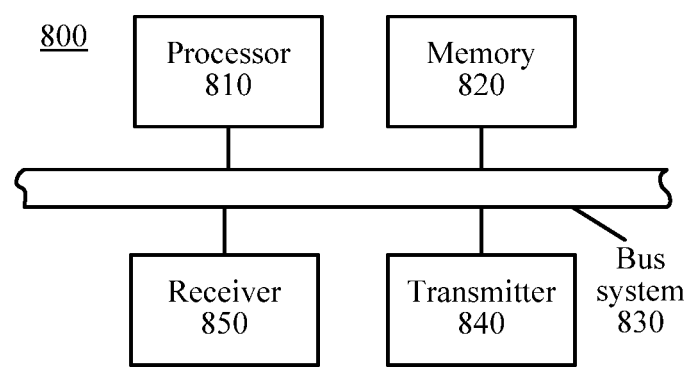
FIG. 8 is a schematic structural diagram of a communications device according to another embodiment of the present disclosure.

FIG. 8 is a schematic structural diagram of a device according to an embodiment of the present disclosure. The device 800 includes a processor 810, a memory 820, a bus system 830, a transmitter 840, and a receiver 850.

The processor 810, the memory 820, and the transmitter 840 are connected using the bus system 830, where the memory 820 is configured to store an instruction, and the processor 810 is configured to execute the instruction stored in the memory 820. The processor 810 is configured to call, using the bus system 830, the instruction stored in the memory 820. The transmitter 840 is configured to send a first message to a second device, and send a third message to the second device, where the first message includes information about at least one media capture capability supported by the device 800, and at least one first association identifier corresponding to the at least one media capture capability, the third message includes at least one configuration item supported by the device 800 and at least one second association identifier corresponding to the configuration item, and the at least one first association identifier corresponds to the at least one second association identifier in a one-to-one manner.

The receiver 850 is configured to receive a second message sent by the second device, and receive a fourth message sent by the second device, where the second message includes at least one media capture capability that is selected by the second device according to the first message and the third message, and at least one third association identifier corresponding to the at least one media capture capability, and the fourth message is a response message for the third message.

In the technical solution of this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the first association identifier or the second association identifier.

Optionally, in another embodiment, the transmitter 840 is further configured to send a first call setup message to the second device before sending the first message to the second device and sending the third message to the second device, where the first call setup message includes a parameter used to indicate that a CLUE message is supported, and the receiver 850 is further configured to receive a second call setup message sent by the second device, where the second call setup message includes a parameter used to indicate that a CLUE message is supported.

According to this embodiment of the present disclosure, the first call setup message and the second call setup message are H.225 protocol messages in the H.323 protocol suite.

Optionally, in another embodiment, the transmitter 840 is further configured to send a fifth message to the second device according to the second message after the receiver 850 receives the second message sent by the second device and receives the fourth message sent by the second device, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier. The receiver 850 is further configured to receive a sixth message sent by the second device, where the sixth message is a response message for the fifth message, and the transmitter 840 is further configured to send a corresponding media stream on the at least one logical channel according to the sixth message.

Optionally, in another embodiment, the transmitter 840 is further configured to send a first termination message to the second device, where the first termination message includes a fourth association identifier corresponding to at least one to-be-terminated logical channel, and the first termination message is used to request to terminate the at least one to-be-terminated logical channel, and the receiver 850 is further configured to receive a second termination message sent by the second device, where the second termination message is a response message for the first termination message.

Optionally, in another embodiment, the transmitter 840 is further configured to send a first version message to the second device before sending the first message and the third message to the second device, where the first version message is used to indicate a CLUE version supported by the device, and the receiver 850 is further configured to receive a second version message sent by the second device, where the second version message is used to indicate a CLUE version supported by the second device.

Optionally, in another embodiment, the receiver 850 is further configured to receive a second update message sent by the second device after the receiver 850 receives the second message and the fourth message sent by the second device, where the second update message includes at least one to-be-updated media capture capability determined by the second device and at least one third association identifier corresponding to the at least one to-be-updated media capture capability, and the transmitter 840 is further configured to send an updated media stream according to the second update message.

Optionally, in another embodiment, the transmitter 840 is further configured to send a first update message to the second device before the receiver 850 receives the second update message sent by the second device, where the first update message includes information about at least one to-be-updated media capture capability, and at least one first association identifier corresponding to the at least one to-be-updated media capture capability.

Optionally, in another embodiment, the transmitter 840 is further configured to send a first update message and a third update message to the second device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The receiver 850 is further configured to receive a second update message and a fourth update message that are sent by the second device, where the second update message includes at least one to-be-updated media capture capability determined by the second device, and at least one third association identifier corresponding to the at least one to-be-updated media capture capability, and the fourth update message is a response message for the third update message. The transmitter 840 is further configured to send a fifth update message to the second device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The receiving module 850 is further configured to receive a sixth update message sent by the second device, where the sixth update message is a response message for the fifth update message, and the transmitter 840 is further configured to send a corresponding media stream on at least one updated logical channel according to the sixth update message.

Optionally, in another embodiment, the device 800 in FIG. 8 further includes the processor 810, where the receiver 850 is further configured to receive a sixth message sent by the second device, and receive an eighth message sent by the second device, where the sixth message includes information about at least one media capture capability supported by the second device, and at least one fifth association identifier corresponding to the at least one media capture capability supported by the second device, the eighth message includes at least one configuration item supported by the second device and at least one sixth association identifier corresponding to the at least one configuration item supported by the second device, and the at least one fifth association identifier corresponds to the at least one sixth association identifier. The processor 810 is configured to select at least one media capture capability according to the sixth message and the eighth message. The transmitter 840 is further configured to send a seventh message to the second device, and send a ninth message to the second device, where the seventh message includes the at least one media capture capability selected by the device, and at least one seventh association identifier corresponding to the at least one media capture capability selected by the device, and the ninth message is a response message for the eighth message. The receiver 850 is further configured to receive a tenth message sent by the second device, where the tenth message includes at least one eighth association identifier corresponding to at least one configuration item selected by the device, the tenth message is used to request to enable at least one logical channel corresponding to the eighth association identifier, and the at least one eighth association identifier respectively corresponds to the at least one seventh association identifier. The transmitter 840 is further configured to send an eleventh message to the second device, where the eleventh message is a response message for the tenth message, and the receiver 850 is further configured to receive, on the at least one logical channel, a media stream sent by the second device.

According to this embodiment of the present disclosure, the device 800 is an MCU.

According to this embodiment of the present disclosure, the device 800 and the second device support CLUE, and the first message, the second message, the third message, and the fourth message are H.245 protocol messages in the H.323 protocol suite.

According to this embodiment of the present disclosure, the first message is a request message, the second message is a terminal capability set message, the third message is a request message, and the fourth message is a terminal capability set acknowledgment message.

For operations and functions of the units of the device 800 for negotiating a media capability, refer to the embodiment in FIG. 2. To avoid repetition, details are not described herein again.

Figure 9:
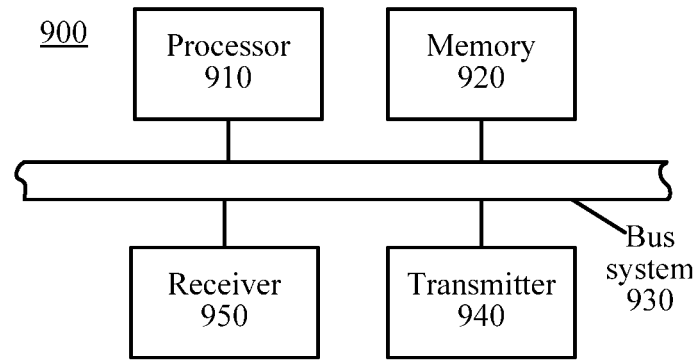
FIG. 9 is a schematic structural diagram of a communications device according to another embodiment of the present disclosure.

FIG. 9 is a schematic structural diagram of a device according to an embodiment of the present disclosure. The device 900 includes a processor 910, a memory 920, a bus system 930, a transmitter 940, and a receiver 950.

The processor 910, the memory 920, the receiver 930 and the transmitter 940 are connected using the bus system 930, where the memory 920 is configured to store an instruction, and the processor 910 is configured to execute the instruction stored in the memory 920. The processor 910 is configured to call, using the bus system 930, the instruction stored in the memory 920.

The receiver 950 is configured to receive a first message sent by a first device, and receive a third message sent by the first device, where the first message includes information about at least one media capture capability supported by the first device, and at least one first association identifier corresponding to the at least one media capture capability, the third message includes at least one configuration item supported by the first device and at least one second association identifier corresponding to the configuration item, and the at least one first association identifier corresponds to the at least one second association identifier.

The processor 910 is configured to select at least one media capture capability according to the first message and the third message.

The transmitter 940 is configured to send a second message to the first device and send a fourth message to the first device, where the second message includes at least one media capture capability selected by the device 900 and at least one third association identifier corresponding to the at least one media capture capability, and the fourth message is a response message for the third message.

In the technical solution of this embodiment of the present disclosure, a common multimedia transfer protocol message carries at least one media capture capability and a corresponding association identifier, and at least one capability configuration item and a corresponding association identifier, to implement multi-stream media capability negotiation between two communication parties such that multi-stream media capability negotiation can be implemented using CLUE when the common multimedia transfer protocol is used.

According to this embodiment of the present disclosure, the at least one first association identifier is respectively the same as the at least one second association identifier, and/or the third association identifier is a subset of the first association identifier or the second association identifier.

Optionally, in another embodiment, the receiver 950 is further configured to receive a first call setup message sent by the first device before receiving the first message sent by the first device and receiving the third message sent by the first device, where the first call setup message includes a parameter used to indicate that a CLUE message is supported, and the transmitter 940 is further configured to send a second call setup message to the first device, where the second call setup message includes a parameter used to indicate that a CLUE message is supported.

According to this embodiment of the present disclosure, the first call setup message and the second call setup message are H.225 protocol messages in the H.323 protocol suite.

Optionally, in another embodiment, the receiver 950 is further configured to receive a fifth message that is sent by the first device according to the second message after the transmitter 940 sends the second message to the first device and sends the fourth message to the first device, where the fifth message includes at least one fourth association identifier corresponding to the configuration item, the fifth message is used to request to enable at least one logical channel corresponding to the at least one fourth association identifier, and the at least one fourth association identifier respectively corresponds to the at least one third association identifier. The transmitter 940 is further configured to send a sixth message to the first device, where the sixth message is a response message for the fifth message, and the receiver 950 is further configured to receive, on the at least one logical channel, a corresponding media stream that is sent by the first device according to the sixth message.

Optionally, in another embodiment, the receiver 950 is further configured to receive a first termination message sent by the first device, where the first termination message includes a fourth association identifier corresponding to at least one to-be-terminated logical channel, and the first termination message is used to request to terminate the at least one to-be-terminated logical channel, and the transmitter 940 is further configured to send a second termination message to the first device, where the second termination message is a response message for the first termination message.

Optionally, in another embodiment, the receiver 950 is further configured to receive a first version message sent by the first device before the receiver 950 receives the first message sent by the first device and receives the third message sent by the first device, where the first version message is used to indicate a CLUE version supported by first device, and the transmitter 940 is further configured to send a second version message to the first device, where the second version message is used to indicate a CLUE version supported by the device 900.

Optionally, in another embodiment, the transmitter 940 is further configured to send a second update message to the first device after sending the second message to the first device and sending the fourth message to the first device, where the second update message includes at least one to-be-updated media capture capability determined by the device 900 and at least one third association identifier corresponding to the at least one to-be-updated media capture capability, and the receiver 950 is further configured to receive an updated media stream that is sent by the first device according to the second update message.

Optionally, in another embodiment, the receiver 950 is further configured to receive a first update message sent by the first device before the transmitter 940 sends the second update message to the first device, where the first update message includes information about at least one to-be-updated media capture capability, and at least one first association identifier corresponding to the at least one to-be-updated media capture capability.

Optionally, in another embodiment, the receiver 950 is further configured to receive a first update message and a third update message that are sent by the first device, where the first update message includes information about at least one to-be-updated media capture capability, and at least one first association identifier corresponding to the at least one to-be-updated media capture capability, and the third update message includes at least one to-be-updated configuration item and at least one second association identifier corresponding to the at least one to-be-updated configuration item. The transmitter 940 is further configured to send a second update message and a fourth update message to the first device, where the second update message includes at least one to-be-updated media capture capability determined by the device 900 and at least one first association identifier corresponding to the at least one to-be-updated media capture capability, and the fourth update message is a response message for the third update message. The receiver 950 is further configured to receive a fifth update message that is sent by the first device according to the second update message, where the fifth update message includes at least one fourth association identifier corresponding to the at least one to-be-updated configuration item, the fifth update message is used to request to enable at least one to-be-updated logical channel, and at least one third association identifier of the at least one to-be-updated configuration item respectively corresponds to the at least one fourth association identifier of the at least one to-be-updated configuration item. The transmitter 940 is further configured to send a sixth update message to the first device, where the sixth update message is a response message for the fifth update message, and the receiver 950 is further configured to receive, on at least one updated logical channel, a corresponding media stream that is sent by the first device according to the sixth update message.

Optionally, in another embodiment, the transmitter 940 is further configured to send a sixth message to the first device, and send an eighth message to the first device after sending the second message to the first device and sending the fourth message to the first device, where the sixth message includes information about at least one media capture capability supported by the device 900, and at least one fifth association identifier corresponding to the at least one media capture capability supported by the device 900, the eighth message includes at least one configuration item supported by the device 900 and at least one sixth association identifier corresponding to the at least one configuration item supported by the device 900, and the at least one fifth association identifier corresponds to the at least one sixth association identifier. The receiver 950 is further configured to receive a seventh message sent by the first device, and receive a ninth message sent by the first device, where the seventh message includes at least one media capture capability selected by the first device and at least one seventh association identifier corresponding to the at least one media capture capability selected by the first device, and the ninth message is a response message for the eighth message. The transmitter 940 is further configured to send a tenth message to the first device, where the tenth message includes at least one configuration item selected by the first device and at least one eighth association identifier corresponding to the at least one configuration item selected by the first device, the tenth message is used to request to enable at least one logical channel corresponding to the eighth association identifier, and the at least one eighth association identifier respectively corresponds to the at least one seventh association identifier. The receiver 950 is further configured to receive an eleventh message sent by the first device, where the eleventh message is a response message for the tenth message, and the transmitter 940 is further configured to send a media stream on the at least one logical channel to the first device.

According to this embodiment of the present disclosure, the first device is an MCU.

According to this embodiment of the present disclosure, the first device and the device 900 support CLUE, and the first message, the second message, the third message, and the fourth message are H.245 protocol messages in the H.323 protocol suite.

According to this embodiment of the present disclosure, the first message is a request message, the second message is a terminal capability set message, the third message is a request message, and the fourth message is a terminal capability set acknowledgment message.

For operations and functions of the units of the device 900 for negotiating a media capability, refer to the embodiment in FIG. 3. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, at least one unit or component may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a portable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for negotiating a media capability, comprising:

sending, by a first device, a first message to a second device, wherein the first message comprises information about at least one media capture capability supported by the first device, and at least one first association identifier corresponding to the at least one media capture capability;

sending, by the first device, a third message to the second device, wherein the third message comprises at least one configuration item supported by the first device and at least one second association identifier corresponding to the at least one configuration item, and wherein the at least one first association identifier corresponds to the at least one second association identifier in a one-to-one manner;

receiving, by the first device, a second message sent by the second device, wherein the second message comprises the at least one media capture capability that is selected by the second device according to the first message and the third message, and at least one third association identifier corresponding to the at least one media capture capability;

receiving, by the first device, a fourth message sent by the second device, wherein the fourth message is a response message for the third message, wherein before sending the first message to the second device and before sending the third message to the second device, the method further comprises:

sending, by the first device, a first call setup message to the second device, wherein the first call setup message comprises a parameter used to indicate that a controlling multiple streams for telepresence message is supported; and receiving, by the first device, a second call setup message sent by the second device, wherein the second call setup message comprises the parameter used to indicate that the controlling multiple streams for telepresence message is supported, and wherein the first call setup message and the second call setup message are H.225 protocol messages in a H.323 protocol suite.

2. The method according to claim 1, wherein the at least one first association identifier is same as the at least one second association identifier, and wherein the third association identifier is a subset of the first association identifier.

3. The method according to claim 1, wherein the at least one first association identifier is same as the at least one second association identifier, and wherein the third association identifier is a subset of the second association identifier.

4. The method according to claim 1, wherein the at least one first association identifier is same as the at least one second association identifier.

5. The method according to claim 1, wherein the third association identifier is a subset of the first association identifier or a subset of the second association identifier.

6. The method according to claim 1, wherein after receiving, by the first device, the second message sent by the second device, and wherein receiving, by the first device, the fourth message sent by the second device, the method further comprises:
   sending, by the first device, a fifth message to the second device according to the second message, wherein the fifth message comprises at least one fourth association identifier corresponding to the at least one configuration item, wherein the fifth message is used to request to enable at least one logical channel corresponding to the at least one fourth association identifier, and wherein the at least one fourth association identifier respectively corresponds to the at least one third association identifier;
   receiving, by the first device, a sixth message sent by the second device, wherein the sixth message is a response message for the fifth message; and
   sending, by the first device, a corresponding media stream on the at least one logical channel according to the sixth message.

7. The method according to claim 6, further comprising:
   sending, by the first device, a first termination message to the second device, wherein the first termination message comprises a fourth association identifier corresponding to at least one to-be-terminated logical channel, and wherein the first termination message is used to request to terminate the at least one to-be-terminated logical channel; and
   receiving, by the first device, a second termination message sent by the second device, wherein the second termination message is a response message for the first termination message.

8. The method according to claim 1, wherein before sending, by the first device, the first message to the second device, and wherein before sending, by the first device, the third message to the second device, the method further comprises:
   sending, by the first device, a first version message to the second device, wherein the first version message is used to indicate a controlling multiple streams for telepresence version supported by the first device; and
   receiving, by the first device, a second version message sent by the second device, wherein the second version message is used to indicate the controlling multiple streams for telepresence version supported by the second device.

9. The method according to claim 1, wherein after receiving, by the first device, the second message sent by the second device, and wherein after receiving, by the first device, the fourth message sent by the second device, the method further comprises:
   receiving, by the first device, a second update message sent by the second device, wherein the second update message comprises at least one to-be-updated media capture capability determined by the second device and the at least one third association identifier corresponding to the at least one to-be-updated media capture capability; and
   sending, by the first device, an updated media stream according to the second update message.

10. The method according to claim 9, wherein before receiving, by the first device, the second update message sent by the second device, the method further comprises sending, by the first device, a first update message to the second device, wherein the first update message comprises information about at least one to-be-updated media capture capability, and the at least one first association identifier corresponding to the at least one to-be-updated media capture capability.

11. A method for negotiating a media capability comprising:
   sending, by a first device, a first message to a second device, wherein the first message comprises information about at least one media capture capability supported by the first device, and at least one first association identifier corresponding to the at least one media capture capability;
   sending, by the first device, a third message to the second device, wherein the third message comprises at least one configuration item supported by the first device and at least one second association identifier corresponding to the at least one configuration item, and wherein the at least one first association identifier corresponds to the at least one second association identifier in a one-to-one manner;
   receiving, by the first device, a second message sent by the second device, wherein the second message comprises the at least one media capture capability that is selected by the second device according to the first message and the third message, and at least one third association identifier corresponding to the at least one media capture capability;
   receiving, by the first device, a fourth message sent by the second device, wherein the fourth message is a response message for the third message;
   sending, by the first device, a first update message and a third update message to the second device, wherein the first update message comprises information about at least one to-be-updated media capture capability, and the at least one first association identifier corresponding to the at least one to-be-updated media capture capability, and wherein the third update message comprises at least one to-be-updated configuration item and the at least one second association identifier corresponding to the at least one to-be-updated configuration item;
   receiving, by the first device, a second update message and a fourth update message that are sent by the second device, wherein the second update message comprises the at least one to-be-updated media capture capability determined by the second device, and the at least one third association identifier corresponding to the at least one to-be-updated media capture capability, and wherein the fourth update message is a response message for the third update message;

sending, by the first device, a fifth update message to the second device according to the second update message, wherein the fifth update message comprises at least one fourth association identifier corresponding to the at least one to-be-updated configuration item, wherein the fifth update message is used to request to enable at least one to-be-updated logical channel, and wherein the at least one third association identifier of the at least one to-be-updated configuration item respectively corresponds to the at least one fourth association identifier of the at least one to-be-updated configuration item;

receiving, by the first device, a sixth update message sent by the second device, wherein the sixth update message is a response message for the fifth update message; and sending, by the first device, a corresponding media stream on at least one updated logical channel according to the sixth update message.

12. A method for negotiating a media capability comprising:

sending, by a first device, a first message to a second device, wherein the first message comprises information about at least one media capture capability supported by the first device, and at least one first association identifier corresponding to the at least one media capture capability;

sending, by the first device, a third message to the second device, wherein the third message comprises at least one configuration item supported by the first device and at least one second association identifier corresponding to the at least one configuration item, and wherein the at least one first association identifier corresponds to the at least one second association identifier in a one-to-one manner;

receiving, by the first device, a second message sent by the second device, wherein the second message comprises the at least one media capture capability that is selected by the second device according to the first message and the third message, and at least one third association identifier corresponding to the at least one media capture capability;

receiving, by the first device, a fourth message sent by the second device, wherein the fourth message is a response message for the third message;

receiving, by the first device, a sixth message sent by the second device, wherein the sixth message comprises the information about the at least one media capture capability supported by the second device, and at least one fifth association identifier corresponding to the at least one media capture capability supported by the second device;

receiving, by the first device, an eighth message sent by the second device, wherein the eighth message comprises the at least one configuration item supported by the second device and at least one sixth association identifier corresponding to the at least one configuration item supported by the second device, and wherein the at least one fifth association identifier corresponds to the at least one sixth association identifier;

selecting, by the first device, the at least one media capture capability according to the sixth message and the eighth message;

sending, by the first device, a seventh message to the second device, wherein the seventh message comprises the at least one media capture capability selected by the first device, and at least one seventh association identifier corresponding to the at least one media capture capability selected by the first device;

sending, by the first device, a ninth message to the second device, wherein the ninth message is a response message for the eighth message;

receiving, by the first device, a tenth message sent by the second device, wherein the tenth message comprises at least one eighth association identifier corresponding to the at least one configuration item selected by the first device, wherein the tenth message is used to request to enable at least one logical channel corresponding to the at least one eighth association identifier, and wherein the at least one eighth association identifier respectively corresponds to the at least one seventh association identifier;

sending, by the first device, an eleventh message to the second device, wherein the eleventh message is a response message for the tenth message; and receiving, by the first device, on the at least one logical channel, a media stream sent by the second device.

13. A device for negotiating a media capability, comprising:

a transmitter configured to:
send a first message to a second device, wherein the first message comprises information about at least one media capture capability supported by the device, and at least one first association identifier corresponding to the at least one media capture capability; and send a third message to the second device, wherein the third message comprises at least one configuration item supported by the device and at least one second association identifier corresponding to the at least one configuration item, and wherein the at least one first association identifier corresponds to the at least one second association identifier in a one-to-one manner; and a receiver coupled to the transmitter and configured to:
receive a second message sent by the second device, wherein the second message comprises the at least one media capture capability that is selected by the second device according to the first message and the third message, and at least one third association identifier corresponding to the at least one media capture capability; and receive a fourth message sent by the second device, wherein the fourth message is a response message for the third message, wherein after receiving the second message and after receiving the fourth message, the receiver is further configured to:
send a fifth message to the second device according to the second message, wherein the fifth message comprises at least one fourth association identifier corresponding to the at least one configuration item, wherein the fifth message is used to request to enable at least one logical channel corresponding to the at least one fourth association identifier, and wherein the at least one fourth association identifier respectively corresponds to the at least one third association identifier;

receive a sixth message sent by the second device, wherein the sixth message is a response message for the fifth message; and send a corresponding media stream on the at least one logical channel according to the sixth message.

14. The device according to claim 13, wherein the at least one first association identifier is same as the at least one second association identifier, and wherein the third association identifier is a subset of the first association identifier.

15. The device according to claim 13, wherein the at least one first association identifier is same as the at least one second association identifier, and wherein the third association identifier is a subset of the second association identifier.

16. The device according to claim 13, wherein the at least one first association identifier is same as the at least one second association identifier.

17. The device according to claim 13, wherein the third association identifier is a subset of the first association identifier or a subset of the second association identifier.

18. The device according to claim 13, wherein the transmitter is further configured to send a first call setup message to the second device before sending the first message and the third message to the second device, wherein the receiver is further configured to receive a second call setup message sent by the second device before sending, by the transmitter, the first message and the third message to the second device, and wherein the second call setup message comprises a parameter used to indicate that a controlling multiple streams for telepresence message is supported.

* * * * *